US008786613B2

(12) United States Patent
Millman

(10) Patent No.: US 8,786,613 B2
(45) Date of Patent: *Jul. 22, 2014

(54) METHOD AND SYSTEM FOR INTERACTIVE SIMULATION OF MATERIALS AND MODELS

(71) Applicant: Alan Millman, Willowbrook, IL (US)

(72) Inventor: Alan Millman, Willowbrook, IL (US)

(*) Notice: Subject to any disclaimer, the term of this patent is extended or adjusted under 35 U.S.C. 154(b) by 17 days.

This patent is subject to a terminal disclaimer.

(21) Appl. No.: 13/792,860

(22) Filed: Mar. 11, 2013

(65) Prior Publication Data

US 2013/0187930 A1 Jul. 25, 2013

Related U.S. Application Data

(63) Continuation-in-part of application No. 11/784,455, filed on Apr. 6, 2007, now Pat. No. 8,395,626.

(60) Provisional application No. 60/790,093, filed on Apr. 8, 2006.

(51) Int. Cl.
*G06T 13/00* (2011.01)
*G09B 23/28* (2006.01)
*G06T 13/20* (2011.01)
*G06F 17/50* (2006.01)
*G06T 19/00* (2011.01)

(52) U.S. Cl.
CPC ............ *G06T 13/20* (2013.01); *G06F 2217/16* (2013.01); *G06F 17/5009* (2013.01); *G06T 19/00* (2013.01); *G06F 17/5018* (2013.01)
USPC ............ 345/473; 345/475; 345/474; 434/262

(58) Field of Classification Search
CPC ..................................................... G06F 3/016
USPC ..................................................... 345/473
See application file for complete search history.

(56) References Cited

U.S. PATENT DOCUMENTS

| | | |
|---|---|---|
| 3,775,865 A | 12/1973 | Rowan |
| 4,321,047 A | 3/1982 | Landis |
| 4,789,340 A | 12/1988 | Zikria |
| 4,907,973 A | 3/1990 | Hon |
| 5,055,051 A | 10/1991 | Duncan |
| 5,061,187 A | 10/1991 | Jerath |
| 5,149,270 A | 9/1992 | McKeown |
| 5,687,259 A | 11/1997 | Linford |

(Continued)

FOREIGN PATENT DOCUMENTS

WO WO 01/59710 A1 8/2001
WO PCT/US2007/008554 4/2007

OTHER PUBLICATIONS

Finite Element Modeling in Surgery Simulation, Morten Bro-Nielsen, Proceedings of the IEEE, Mar. 1998.

(Continued)

*Primary Examiner* — Kee M Tung
*Assistant Examiner* — Zhengxi Liu
(74) *Attorney, Agent, or Firm* — Lesavich High-Tech Law Group, S.C.; Stephen Lesavich

(57) ABSTRACT

A method and system for drawing, displaying, editing animating, simulating and interacting with one or more virtual polygonal, spline, volumetric models, three-dimensional visual models or robotic models. The method and system provide flexible simulation, the ability to combine rigid and flexible simulation on plural portions of a model, rendering of haptic forces and force-feedback to a user.

20 Claims, 23 Drawing Sheets

(56) References Cited

U.S. PATENT DOCUMENTS

| | | |
|---|---|---|
| 5,722,836 A | 3/1998 | Younker |
| 5,736,991 A | 4/1998 | Tada |
| 5,755,577 A | 5/1998 | Gillio |
| 5,766,016 A | 6/1998 | Sinclair |
| 5,768,134 A | 6/1998 | Swaelens |
| 5,774,175 A | 6/1998 | Hattori |
| 5,785,531 A | 7/1998 | Leung |
| 5,791,908 A | 8/1998 | Gillio |
| 5,800,177 A | 9/1998 | Gillio |
| 5,800,178 A | 9/1998 | Gillio |
| 5,825,941 A | 10/1998 | Linford |
| 5,835,693 A | 11/1998 | Lynch |
| 5,854,850 A | 12/1998 | Linford |
| 5,855,553 A | 1/1999 | Tajima |
| 5,871,018 A | 2/1999 | Delp |
| 5,873,732 A | 2/1999 | Hasson |
| 5,882,206 A | 3/1999 | Gillio |
| 5,912,675 A | 6/1999 | Laperriere |
| 5,947,743 A | 9/1999 | Hasson |
| 5,947,744 A | 9/1999 | Izzat |
| 5,956,040 A | 9/1999 | Asano |
| 5,974,073 A | 10/1999 | Cannard |
| 5,978,523 A | 11/1999 | Linford |
| 6,049,622 A | 4/2000 | Robb |
| 6,057,859 A | 5/2000 | Handelman et al. |
| 6,069,634 A | 5/2000 | Gibson |
| 6,074,213 A | 6/2000 | Hon |
| 6,077,082 A | 6/2000 | Gibson |
| 6,081,611 A | 6/2000 | Linford |
| 6,102,698 A | 8/2000 | Staples |
| 6,106,301 A | 8/2000 | Merril |
| 6,113,395 A | 9/2000 | Hon |
| 6,217,530 B1 | 4/2001 | Martin |
| 6,240,375 B1 | 5/2001 | Sonoda |
| 6,287,748 B1 | 9/2001 | Lawton |
| 6,323,837 B1 | 11/2001 | Rosenberg |
| 6,332,903 B1 | 12/2001 | Otani |
| 6,336,812 B1 | 1/2002 | Cooper |
| 6,347,460 B1 | 2/2002 | Forrer |
| 6,353,677 B1 | 3/2002 | Pfister |
| 6,353,768 B1 | 3/2002 | Karafillis |
| 6,356,807 B1 | 3/2002 | McGee |
| 6,377,011 B1 | 4/2002 | Ben-Ur |
| 6,379,866 B2 | 4/2002 | Lawton |
| 6,385,509 B2 | 5/2002 | Das |
| 6,403,004 B1 | 6/2002 | Stecker |
| 6,405,158 B1 | 6/2002 | Massie |
| 6,448,968 B1 | 9/2002 | Pfister et al. |
| 6,463,356 B1 | 10/2002 | Hattori |
| 6,470,302 B1 | 10/2002 | Cunningham |
| 6,488,507 B1 | 12/2002 | Stoloff |
| 6,500,133 B2 | 12/2002 | Martin |
| 6,512,516 B1 | 1/2003 | Schill et al. |
| 6,537,729 B1 | 3/2003 | Lawton |
| 6,538,634 B1 | 3/2003 | Chui |
| 6,556,256 B1 | 4/2003 | Kato et al. |
| 6,654,000 B2 | 11/2003 | Rosenberg |
| 6,659,776 B1 | 12/2003 | Aumann |
| 6,666,835 B2 | 12/2003 | Martin |
| 6,671,651 B2 | 12/2003 | Goodwin et al. |
| 6,681,141 B2 | 1/2004 | Ferreri |
| 6,683,985 B1 | 1/2004 | Kase |
| 6,704,694 B1 | 3/2004 | Basdogan |
| 6,708,142 B1 | 3/2004 | Baillot et al. |
| 6,714,901 B1 | 3/2004 | Cotin |
| 6,727,043 B2 | 4/2004 | Lawton |
| 6,749,976 B2 | 6/2004 | Lawton |
| 6,762,002 B2 | 7/2004 | Lawton |
| 6,805,492 B2 | 10/2004 | Hashimoto |
| 6,813,924 B1 | 11/2004 | Van Der Aa |
| 6,816,820 B1 | 11/2004 | Friedl |
| 6,817,530 B2 | 11/2004 | Labrec |
| 6,832,131 B2 | 12/2004 | Hattori |
| 6,857,878 B1 | 2/2005 | Chosack |
| 6,863,536 B1 | 3/2005 | Fisher |
| 6,912,449 B2 | 6/2005 | Sabe |
| 6,929,481 B1 | 8/2005 | Alexander |
| 6,963,792 B1 | 11/2005 | Green |
| 6,970,171 B2 | 11/2005 | Baraff et al. |
| 7,013,201 B2 | 3/2006 | Hattori |
| 7,023,423 B2 | 4/2006 | Rosenberg |
| 7,121,832 B2 | 10/2006 | Hsieh |
| 7,202,851 B2 | 4/2007 | Cunningham |
| 7,215,326 B2 | 5/2007 | Rosenberg |
| 7,239,992 B2 | 7/2007 | Ayache |
| 7,249,951 B2 | 7/2007 | Bevirt |
| 7,261,565 B2 | 8/2007 | Chosack |
| 7,277,833 B2 | 10/2007 | Kukuk |
| 7,280,095 B2 | 10/2007 | Grant |
| 7,291,016 B2 | 11/2007 | Otto |
| 7,292,716 B2 | 11/2007 | Kim |
| 7,297,390 B2 | 11/2007 | Simmons |
| 7,298,374 B2 | 11/2007 | Styles |
| 7,307,619 B2 | 12/2007 | Cunningham |
| 7,308,831 B2 | 12/2007 | Cunningham |
| 7,333,111 B2 | 2/2008 | Ng-Thow-Hing |
| 7,812,815 B2 | 10/2010 | Banerjee et al. |
| 8,395,626 B2 | 3/2013 | Millman |
| 8,463,765 B2 | 6/2013 | Lesavich |
| 2002/0035458 A1 | 3/2002 | Kim |
| 2002/0042703 A1 | 4/2002 | Furusu |
| 2002/0161026 A1 | 10/2002 | Paralkar |
| 2002/0168618 A1 | 11/2002 | Anderson |
| 2002/0180739 A1 | 12/2002 | Reynolds |
| 2003/0088389 A1 | 5/2003 | Balaniuk |
| 2003/0091967 A1 | 5/2003 | Chosack |
| 2003/0182091 A1 | 9/2003 | Kukuk |
| 2004/0021660 A1 | 2/2004 | Ng-Thow-Hing |
| 2004/0024311 A1 | 2/2004 | Quaid |
| 2004/0043368 A1 | 3/2004 | Hsieh |
| 2004/0252872 A1 | 12/2004 | Tsai |
| 2004/0254566 A1 | 12/2004 | Plicchi |
| 2004/0254771 A1 | 12/2004 | Riener |
| 2004/0259057 A1 | 12/2004 | Kim |
| 2005/0010326 A1 | 1/2005 | Hayward |
| 2005/0024331 A1 | 2/2005 | Berkley |
| 2005/0032028 A1 | 2/2005 | Chosack |
| 2005/0046629 A1 | 3/2005 | Jeong |
| 2005/0196741 A1 | 9/2005 | Otto |
| 2005/0197800 A1 | 9/2005 | Goodwin |
| 2005/0232511 A1 | 10/2005 | Ziou |
| 2006/0013505 A1 | 1/2006 | Yau |
| 2006/0099557 A1 | 5/2006 | Hyltander |
| 2006/0129719 A1 | 6/2006 | Cruz-Hernandez |
| 2006/0209019 A1 | 9/2006 | Hu |
| 2006/0290695 A1 | 12/2006 | Salomie |
| 2007/0072144 A1 | 3/2007 | Imgrund et al. |
| 2007/0191741 A1 | 8/2007 | Tsai et al. |
| 2007/0239409 A1 | 10/2007 | Alan |
| 2011/0208710 A1 | 8/2011 | Lesavich |
| 2012/0278622 A1 | 11/2012 | Lesavich et al. |

OTHER PUBLICATIONS

Simulating Facial Surgery Using Finite Element Models, R.M. Koch et al., Computer Graphics Proceedings, 1996, XP-002460060.

Toward Realistic Soft-Tissue Modeling in Medical Simulation, Herve Delingette, Proceedings of the IEEE, Mar. 1998, XP-002172862.

Kecskemethy A, Lange C, Grabner G. Object-oriented modeling of multibody dynamics including impacts, ECCM-2001, Cracow, Poland: Jun. 26-29, 2001, pp. 1-28.

Chadwick, et al., 1989, "Layered construction for deformable animated characters", Proceedings of the 16th Annual Conference on Computer Graphics and interactive Techniques SIGGRAPH '89, ACM, New York, NY, pp. 243-252.

Roland S. Burns, "Advanced Control Engineering", Butterworth-Heinemann 2nd edition, Nov. 2001, 39 pages.

Dachille, et al., "Haptic sculpting of dynamic surfaces", Proceedings of the 1999 Symposium on interactive 3D Graphics, Apr. 26-29, 1999, I3D '99, ACM, New York, NY, pp. 103-110.

(56) References Cited

OTHER PUBLICATIONS

Arthur, et al., "Designing and Building the PIT: a Head Tracked Stereo Workspace for Two Users", Second International Immersive Projection Technology Workshop, May 11-12, 1998, pp. 1-10.

Picinbono et al., "Improving realism of a surgery simulator: Linear Anisotropic Elasticity, Complex Interactions and Force Extrapolation", Technical Report No. 4018, INRIA, Sep. 2000, 40 pages.

Stephane Cotin, Herve Delingette, and Nicholas Ayache, Realtime elastic deformations of soft tissues for surgery simulation, IEEE Transactions on Visualization and Computer Graphics, vol. 5, Issue 1, Jan. 1999, pp. 62-73.

Denneman et al., "Rheological Modeling with Hookean Bead-Spring Cubes (SC, BBC and FCC)", vol. 34, Issue 1, pp. 75-95, Jul. 1998.

G. Hamarneh and T. McInerney, "Physics-based shape deformations for medical image analysis," Image Processing: Algorithms and Systems II 5014(1), pp. 354-362, SPIE, 2003.

Kelvin Element definition downloaded from the web, last updated Jan. 11, 1995, 1 page, http://web.mst.edu/.about.wlf/Mechanical/Kelvin.html.

Learoyd, et al., "Alterations with Age in the Viscoelastic Properties of Human Arterial Walls", Circulation Research, vol. XVIII, Mar. 1966, 16 pages.

P. Meseure; C. Chaillou, "A deformable body model for surgical simulation", The Journal of Visualization and Computer Animation, vol. 11, No. 4, pp. 197-208, Oct. 3, 2000, Copyright 2000 John Wiley & Sons, Ltd.

R. Keith Mobley, "An Introduction to Predictive Maintenance, 2nd Edition", Butterworth-Heinemann, Oct. 2002, 45 pages.

Luciano, C., Banerjee, P., Florea, L., Dawe, G., Nov. 14-16, 2005, "Design of the ImmersiveTouch.TM.: a High-Performance Haptic Augmented VR System", Proceedings of Human-Computer Interaction, 10 pages.

J.D. Mulder and R. van Liere, "The personal space station: Bringing interaction within reach", S. Richer, P. Richard, and B. Taravel, editors, Proceedings of the Virtual Reality International Conference, VRIC 2002, pp. 73-81, Mar. 2002.

Sarah F. Gibson, Apr. 1997, "3D chainmail: a fast algorithm for deforming volumetric objects", Proceedings of the 1997 symposium on Interactive 3D graphics, (I3D '97), ACM, New York, NY, USA, 149-ff.

Hills, J.W.; Jensen, J.F., "Telepresence technology in medicine: principles and applications," Proceedings of the IEEE, vol. 86, No. 3, pp. 569-580, Mar. 1998.

U. Meier, O. Lopez, C. Monserrat, M. Juan, and M. Alcaniz, "Real-time deformable models for surgery simulation: a survey", Computer Methods and Programs in Biomedicine, vol. 77, Issue 3, pp. 183-197, Mar. 2005.

Jurriaan D. Mulder, Jack Jansen, and Arjen van Rhijn, May 22-23, 2003, "An affordable optical head tracking system for desktop VR/AR systems", Proceedings of the workshop on Virtual environments 2003, (EGVE '03), ACM, New York, NY, USA, pp. 215-223.

Joanna L. Power, A. J. Bernheim Brush, Przemyslaw Prusinkiewicz, and David H. Salesin. 1999. Interactive arrangement of botanical L-system models. In Proceedings of the 1999 symposium on Interactive 3D graphics (I3D '99). ACM, New York, NY, USA, 175-182.

Eva-Lotta Salinas, Kirsten Rassmus-Grohn, and Calle Sjostrom, "Supporting presence in collaborative environments by haptic force feedback", ACM Transactions on Computer-Human Interaction (TOCHI), vol. 7, Issue 4, Dec. 2000, pp. 461-476.

Wei Ji; Williams, R.L.; Howell, J.N.; Conatser, R.R., Jr.; , "3D Stereo Viewing Evaluation for the Virtual Haptic Back Project," 2006 14th Symposium on Haptic Interfaces for Virtual Environment and Teleoperator Systems, pp. 251-258, Mar. 25-26, 2006.

F. Boux de Casson, C. Laugier, "Modelling the dynamics of a human liver for a minimally invasive surgery simulator", C. Taylor, LA. Colchester (Eds.), Proceedings of the Medical Image Computing and Computer-Assisted Intervention (MICCAI '99), Lecture Notes in Computer Science, vol. 1679, Springer, Berlin, 1999, pp. 1166-1174.

S.Miyazaki, J.Hasegawa, T.Yasuda and S.Yokoi, "A Deformable Object Model for Virtual Manipulation Based on Maintaining Local Shapes," Proceedings of World Multi-Conference on Systemics, Cybernetics and Informatics, SCI2001, Orlando, vol. 6, Jul. 22-25, 2001, pp. 100-105.

Millman et al., "A System for the Implementation and Kinesthetic Display of Virtual Environments," SPIE Conference 1833: Telemanipulator Technology. Boston. pp. 49-57, 1992.

Lenoir, J.; Fonteneau, S.; , "Mixing deformable and rigid-body mechanics simulation," Computer Graphics International, 2004. Proceedings , vol., No., pp. 327-334, Jun. 19-19, 2004.

Jansson, J.; Vergeest, J.S.M.; Kuczogi, G.; Horvath, I.; , "Merging deformable and rigid body mechanics simulation," Computer Animation, 2001. The Fourteenth Conference on Computer Animation. Proceedings , vol., No., pp. 147-156, 2001.

Jansson et al., "Combining deformable and rigid body mechanics simulation," The Vis. Comput. J. (2003).

Toward Realistic Soft-Tissue Modeling in Medical Simulation, Nerve Delingette, Proceedings of the IEEE, Mar. 1998, XP-002172862.

Virtual Reality Vitrectomy Simulator, Paul F. Neumann, Lewis L. Sadler and Jon Gieser, Proceedings of the First International Conference on Medical Image Computing and Computer-Assisted Intervention, 1998, vol. 1496, pp. 910-917.

Virtual Reality Vitrectomy Simulator, Paul F. Neumann, Lewis L. Sadler and Jon Gieser, PhD Thesis University of Illinois, Chicago, Jun. 2000, 96 pp.

Physically Based Models with Rigid and Deformable Components, Demetri Terzopoulos and Andrew Witkin, IEEE Computer Graphics & Applications, Nov. 1988, pp. 41-51.

Scharver, C.; Evenhouse, R.; Johnson, A.; Leigh, J.; , "Pre-surgical cranial implant design using the PARIS.TM. prototype," Virtual Reality, 2004. Proceedings. IEEE , vol., No., pp. 199-291, Mar. 27-31, 2004.

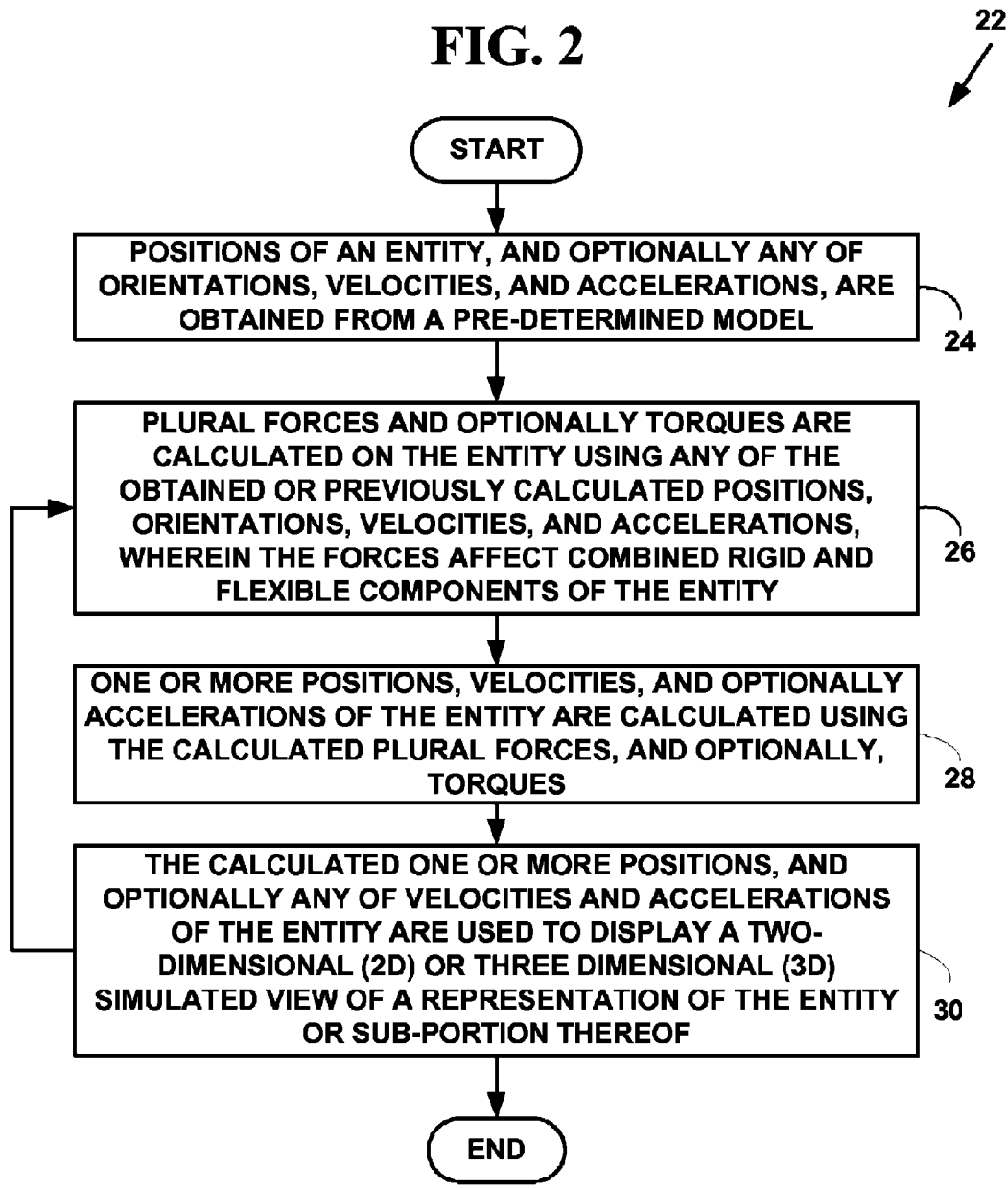

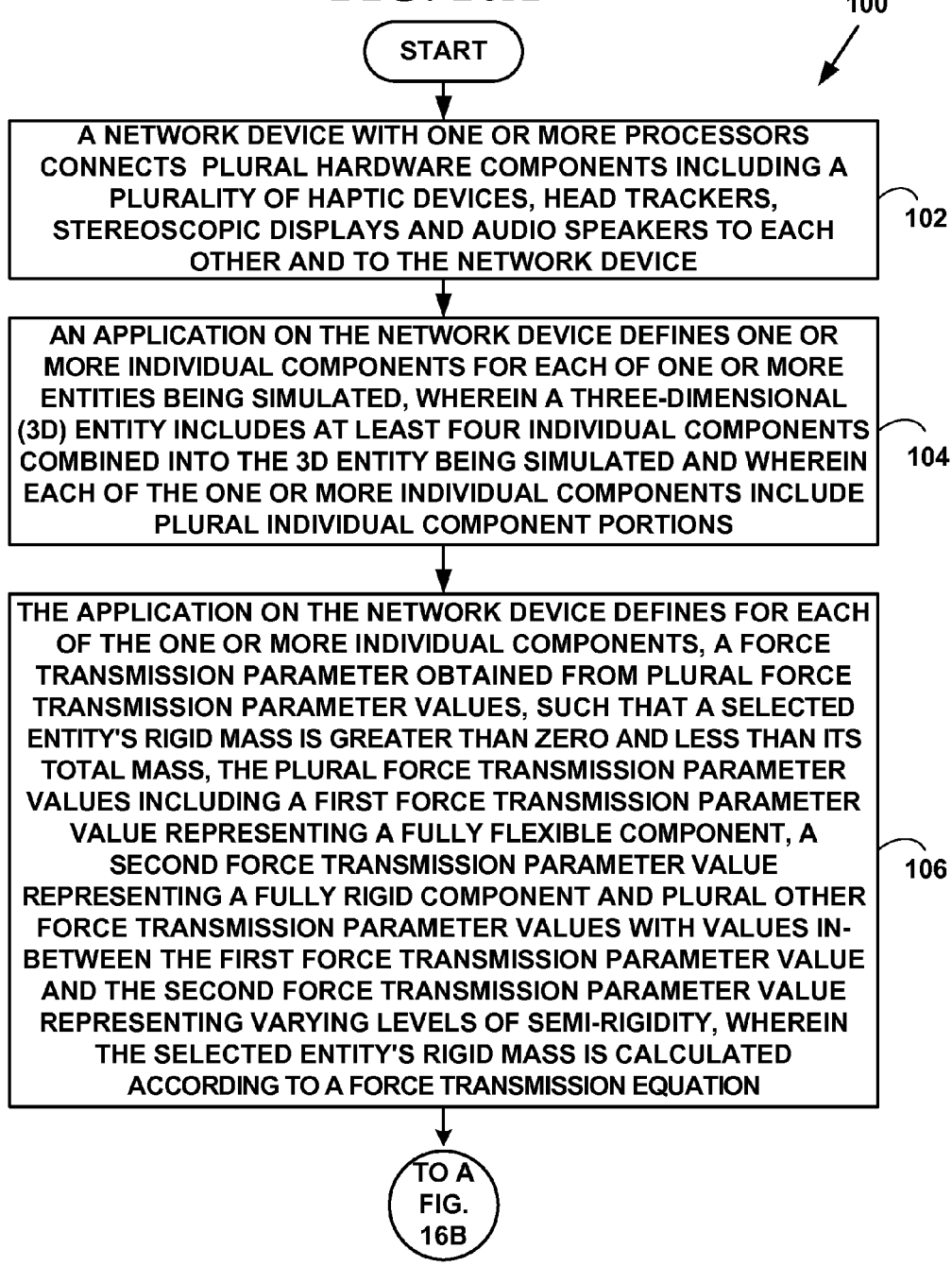

FIG. 16B

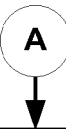

THE APPLICATION ON THE NETWORK DEVICE COMBINES A METHOD FOR SIMULATING FLEXIBLE ENTITIES WITH A METHOD FOR SIMULATING RIGID ENTITIES INTO A COMPOSITE SIMULATION METHOD, THE COMPOSITE METHOD INCLUDING EACH ENTITY BEING SIMULATED COMPRISING ONE OR MORE INDIVIDUAL COMPONENTS AND EACH INDIVIDUAL COMPONENT BEING INDIVIDUALLY DEFINED WITH A SEPARATE FORCE TRANSMISSION PARAMETER VALUE, ALLOWING EACH OF THE PLURALITY OF INDIVIDUAL COMPONENT PORTIONS OF THE ONE OR MORE INDIVIDUAL COMPONENTS OF THE ENTITY BEING SIMULATED TO INCLUDE ANY COMBINATION OF RIGID, SEMI-RIGID AND FLEXIBLE COMPONENTS, SIMULATING EITHER SIMILAR MATERIALS OR COMPOSITES OF DIFFERENT MATERIALS, WHEREIN THE METHOD FOR SIMULATING FLEXIBLE ENTITIES THAT HAS BEEN COMBINED USES A MODEL COMPRISING INDIVIDUAL POINT-MASSES CONNECTED BY IDEALIZED SPRINGS OR DASHPOTS, WHEREIN THE ONE OR MORE INDIVIDUAL COMPONENTS ARE REPRESENTED BY THE POINT-MASSES, WHEREIN IN THE COMPOSITE SIMULATION METHOD, AN ACCELERATION DUE TO RIGID MOTION IS CALCULATED ACCORDING A RIGID ACCELERATION EQUATION AND AN ACCELERATION DUE TO DEFORMATION IS CALCULATED ACCORDING TO DEFORMATION ACCELERATION EQUATION — 108

THE APPLICATION ON THE NETWORK DEVICE WITH THE COMPOSITE SIMULATION METHOD OBTAINS PLURAL POSITIONS, VELOCITIES AND ACCELERATIONS AND A DEFINED FORCE TRANSMISSION PARAMETER VALUE FOR EACH OF THE ONE OR MORE INDIVIDUAL COMPONENTS OF EACH OF THE ONE OR MORE ENTITIES ENTITY BEING SIMULATED — 110

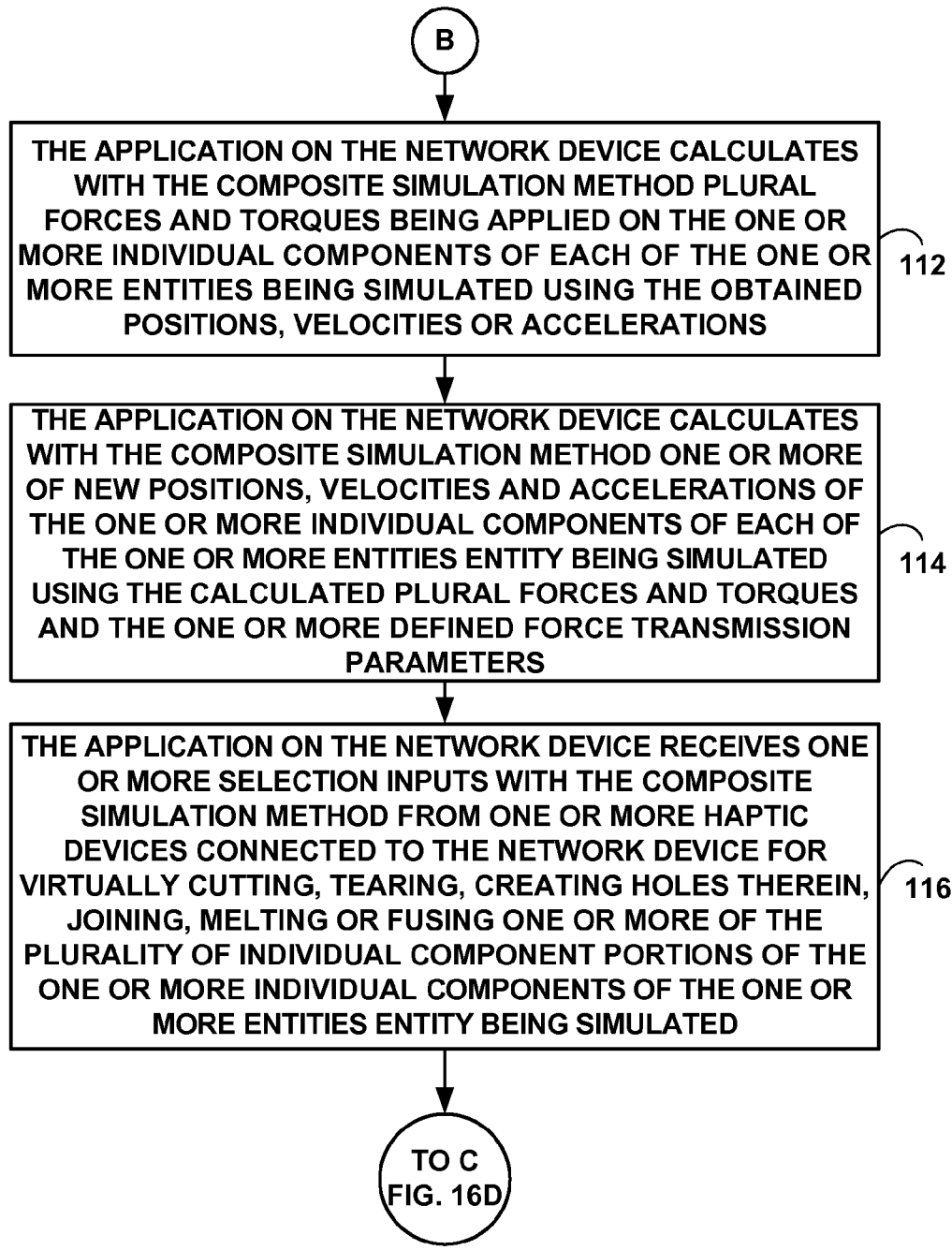

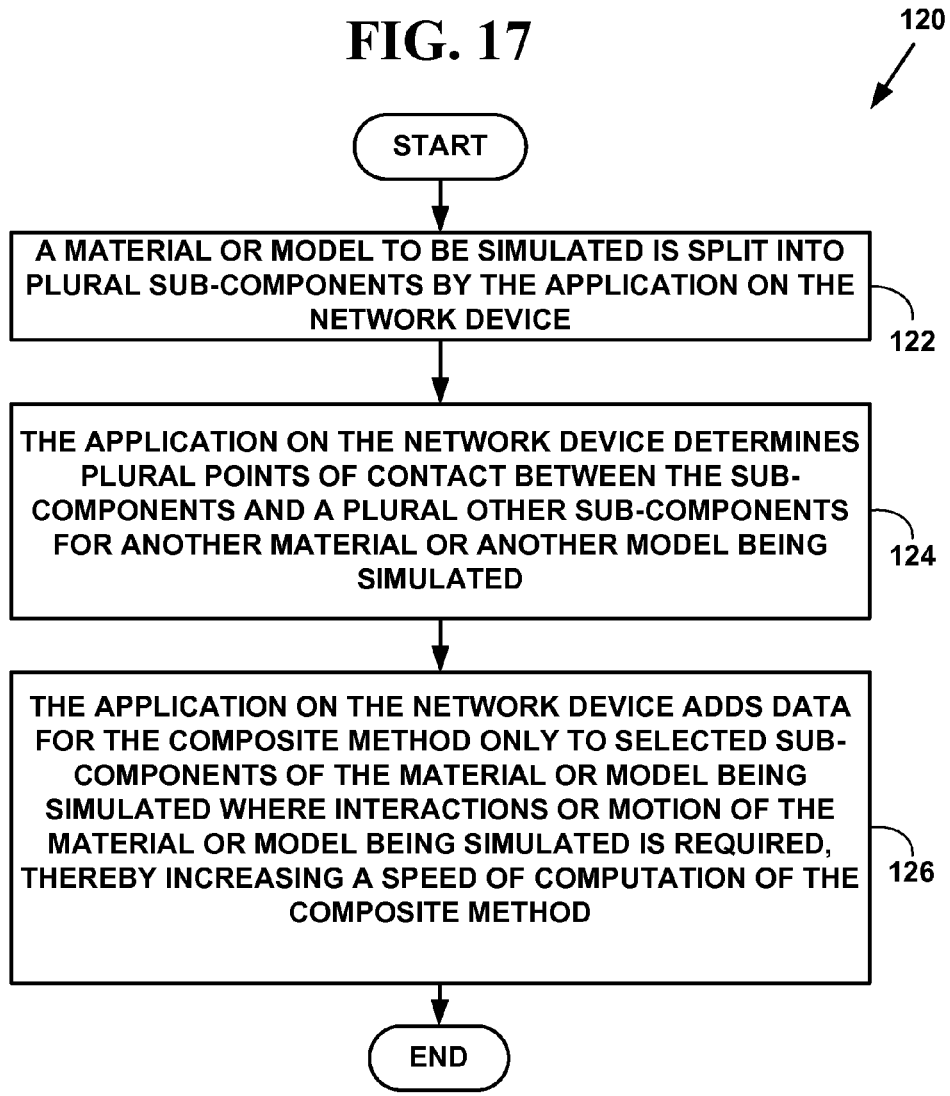

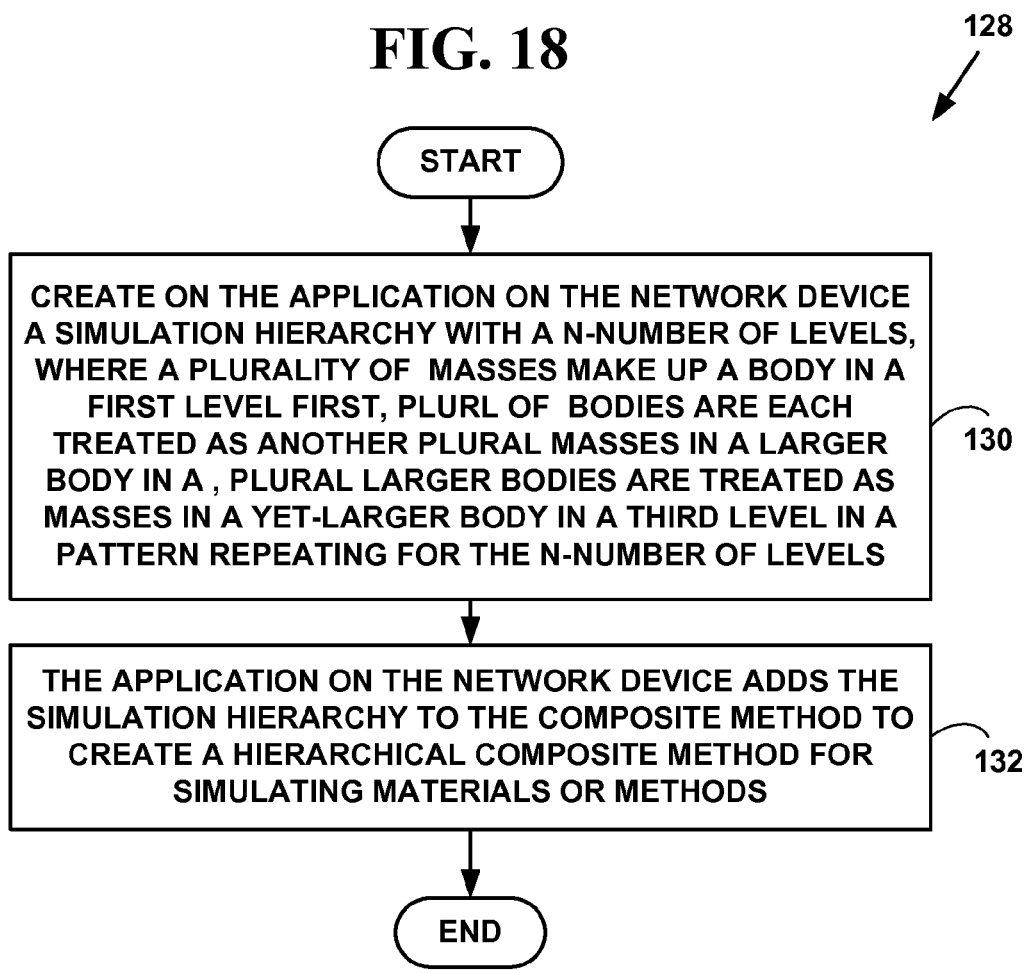

METHOD AND SYSTEM FOR INTERACTIVE SIMULATION OF MATERIALS AND MODELS

CROSS REFERENCES TO RELATED APPLICATIONS

This application claims priority to U.S. Utility patent application Ser. No. 11/784,455, filed Apr. 6, 2007, which claims priority to U.S. Provisional Patent Application 60/790,093, filed Apr. 8, 2006, U.S. Utility patent application Ser. No. 11/784,455, issued as U.S. Pat. No. 8,395,626, on Mar. 12, 2013, the contents of which are incorporated by reference.

FIELD OF THE INVENTION

This invention relates to computer simulations. More specifically, it relates to a method and system for simulation of materials and models with combined rigid and flexible components, and a method of aligning hardware components for interacting with virtual objects.

BACKGROUND OF THE INVENTION

Simulation has many applications. It is used to design and prototype products. It is used to engineer and test materials and designs. It is used for training and education. It is used to create content for various forms of entertainment, animation, and virtual reality. It is also used in medicine; medical simulators include those used for making diagnostics of diseases and medical conditions, and for simulating surgery and surgical techniques. It is used in robotics. And simulation is used for many other purposes.

Simulation affords users the benefits of experience without the risk. Simulation can also be used to more effectively train users by increasing the number and variety of situations with which they come into contact. Simulation also allows research and exploration in new and meaningful ways. Users can repeat a given process many times to determine a best approach, each time trying a different method.

The practice of simulation is usually categorized by methodology. The most popular methods are rigid-body simulation, flexible-body simulation, and finite element analysis.

Rigid-body simulation is the practice of simulating an object using a group of point-masses, each point-mass having an unchanging distance from the other point-masses in the group. The entire group can be represented by a single position—the position of the group's center-of-mass—and a single orientation. Rigid bodies can be connected to each other by constraints or forces. The motion of a rigid body is described by changes in its center-of-mass position and its orientation.

Flexible-body simulation (or spring and dashpot simulation) is the practice of simulating an object using individual point-masses connected by idealized springs. Each spring has associated parameters, and applies equal-and-opposite forces to the masses at each of its ends. The spring attempts to maintain a specified distance between its masses. The motion of a flexible body is described by changes in the positions of each of the body's point-masses.

Finite element analysis (or FEA) is the practice of simulating an object using similarly shaped elements. A finite element model (or FEM) is composed of volumetric elements, such as tetrahedra, each having associated parameters and equations of motion. A group of elements and their parameters are used to describe a system of equations to be solved. The motion of a finite element model is described by the deformations of its elements.

In an interactive simulation, object positions are computed and displayed many times per second to give the appearance of motion. The term frame-rate is defined as the number of times per second the objects are displayed.

A limitation of rigid-body simulations is that they do not allow the simulation of soft objects. They are restricted to rigid objects and rigid or flexible links between these objects.

A limitation of flexible-body simulations is that they have difficulty simulating rigid or semi-rigid objects. As springs are made stiffer, instabilities arise, and their equations become increasingly difficult to solve at interactive frame-rates.

Another limitation of flexible-body simulations is that they simulate rotations by propagating translations across a network of springs. This makes the rotation of a body dependent upon the spring network and the number of steps used to advance the simulation in time. The fewer the number of springs, and the more steps used, the faster the apparent rotation occurs.

A limitation of FEA simulations is that they do not allow interaction with simulated objects, due to the time required for computation. Allowing interaction with simulated objects is desirable in that it provides modalities for approaching tasks in the industries that use simulators, and might allow simulators to be used in new industries.

Another limitation of FEA is the requirement that FEM objects be composed of homogeneously-shaped elements, which makes their creation more difficult, error-prone, and in certain situations, impossible. A more desirable method is an unstructured approach, whereby objects may be made any shape, dimension, or topology.

There are newer simulation technologies which allow for interaction with soft objects. One limitation of some of these technologies is the necessity to precompute certain aspects of the model's response to forces, or to make certain variables unchangeable. This makes it difficult to generate objects, or to change the characteristics of existing objects, while the simulation is running.

Another limitation of certain newer interactive soft-body simulation technologies is their inability to simulate materials that respond to forces in a nonlinear manner. Each object must be made of material or elements whose force-response is linear in nature.

Another limitation of certain newer interactive soft-body simulation technologies is the necessity that objects or elements be composed of homogeneous materials. This does not allow objects composed of heterogeneous materials to be simulated efficiently.

Another limitation of some soft-body technologies is the necessity that objects be made up of incompressible elements, which limits the kinds of materials that can be simulated.

Yet another limitation of some soft-body simulation technologies is an inability to simulate materials that are not in equilibrium. This precludes simulating objects with active, dynamic properties, such as those that change shape when stimulated by an electrical current.

There are a number of other problems specifically associated with interactive material simulations. Research has typically been done in the component areas of collision detection, collision response, rigid-body simulation, and flexible-body simulation. Barriers to a general-purpose interactive material simulation have historically included:

The amount of data to be computed in order to achieve a reasonable simulation

The complexity and number of calculations necessary

Lack of appropriate numerical methods to bring to bear on the simulation

Lack of methods to calculate real-time collisions between irregular moving surfaces Lack of expertise in the calculation of forces between colliding flexible bodies The inability to derive solutions to the motions of complicated dynamic models at interactive rates.

There have been attempts to solve some of these problems. For example, U.S. Pat. No. 7,050,955, entitled "System, method and data structure for simulated interaction with graphical objects," that issued to Carmel et al., teaches "Object simulation and interaction of and between computer-generated or graphical objects in a virtual space includes neutral scene graphs, data structures and procedures for using such graphs and data structures.

U.S. Pat. No. 6,714,901, entitled "Electronic device for processing image-data, for simulating the behaviour of a deformable object," that issued to Cotin et al. teaches "An electronic device for processing image data, particularly image data pertaining to medical procedures, includes a user interface with force feedback (4) corresponding to tool reactions, a "collision" module (18) for estimating a point of intersection between a straight line embodying a displacement derived from the action of the tool and a surface mesh of a given object, and an internal forces module (16) which estimates internal forces exerted on nodes of a first part of at least a volume mesh of the object, on the basis of a displacement applied on nodes pertaining to the surface mesh containing a point of intersection, of boundary conditions, and of node tensors and link tensors, from matrices of rigidity, and a reaction module (20) for determining the reaction force of the object corresponding to its deformation estimated on the basis of the internal forces, such that the force generated by the user interface (4) is balanced by reaction force."

U.S. Pat. No. 6,560,658, entitled "Data storage device with quick and quiet modes," that issued to Singer et al. teaches "Techniques are provided herein for reducing vibrations in various modes of a dynamic system. One such technique comprises incorporating vibration limiting and sensitivity constraints into a partial fraction expansion equation model of the system so as to reduce vibrations to specific levels. Another technique comprises shaping a command determined using the partial fraction expansion equation model to produce a desired output. The entire command may be shaped or only selected portions thereof which produce vibrations. Another technique involves commanding in current to produce saturation in voltage. By doing this, it is possible to command voltage switches. The times at which the switches occur can be set to reduce system vibrations. Other techniques are also provided. These include varying transient portions at the beginning, middle and/or end of a move and using Posicast inputs, among others."

U.S. Pat. No. 6,486,872, entitled "Method and apparatus for providing passive fluid force feedback," that issued to Rosenberg teaches "A method and apparatus for interfacing the motion of an object with a digital processing system includes a sensor for detecting movement of the object along a degree of freedom. A passive pneumatic or hydraulic damper is coupled to the object to provide a damping resistance to the object along the degree of freedom and resist a movement of the object. The damping resistance is provided by regulating the control of a fluid with a digital computing apparatus, thus providing a low-cost, low-power force-feedback interface that is safe for the user. The damper and sensor provide an electromechanical interface between the object and the electrical system. A gimbal or other interface mechanism can be coupled between the damper and the object. The interface is well suited for simulations or video games in which an object such as a joystick is moved and manipulated by the user."

U.S. Pat. No. 6,314,473, entitled "System for removing selected unwanted frequencies in accordance with altered settings in a user interface of a data storage device," that issued to Singer et al., teaches "Techniques are provided herein for reducing vibrations in various modes of a dynamic system. One such technique comprises incorporating vibration limiting and sensitivity constraints into a partial fraction expansion equation model of the system so as to reduce vibrations to specific levels. Another technique comprises shaping a command determined using the partial fraction expansion equation model to produce a desired output. The entire command may be shaped or only selected portions thereof which produce vibrations. Another technique involves commanding in current to produce saturation in voltage. By doing this, it is possible to command voltage switches. The times at which the switches occur can be set to reduce system vibrations. Other techniques are also provided. These include varying transient portions at the beginning, middle and/or end of a move and using Posicast inputs, among others."

U.S. Pat. No. 6,300,937, entitled "Method and apparatus for controlling force feedback for a computer interface device," that issued to Rosenberg teaches "A method and apparatus for controlling and providing force feedback using an interface device manipulated by a user. A microprocessor is provided local to the interface device and reads sensor data from sensors that describes the position and/or other information about an object grasped and moved by the user, such as a joystick. The microprocessor provides the sensor data to a host computer that is coupled to the interface device by a communication bus that preferably includes a serial interface. In a "host-controlled" embodiment, the host computer calculates force values using the sensor data and other parameters of a host application program and sends the force values to the local microprocessor, which directly provides the force values to actuators to apply forces to the user object. In a "reflex" embodiment, the host computer sends high level supervisory commands to the local microprocessor, and the microprocessor independently implements a local process based on the high level command for reading sensor data and providing force values to the actuators using sensor data and other parameters."

U.S. Pat. No. 6,211,848, entitled "Dynamic holographic video with haptic interaction," that issued to Plesniak et al., teaches "A user is able to interact with and modify an electronic holographic image using a force-feedback (or haptic) device, which is capable of sensing and reporting the 3D position of its hand-held stylus and "displaying" appropriate forces to the user. Thus, a user can feel and modify specified shapes in the haptic workspace. The haptic workspace is precisely registered with the free-standing, spatial image displayed by a holographic video (holovideo) system. In the coincident visuo-haptic workspace, a user can see, feel, and interact with synthetic objects that exhibit many of the properties one expects of real ones, and the spatial display enables synthetic objects to become a part of the user's manipulatory space."

U.S. Pat. No. 6,113,395, entitled "Selectable instruments with homing devices for haptic virtual reality medical simulation," that issued to Hon teaches "Invention is apparatus for using selectable instruments in virtual medical simulations with input devices actuated by user and resembling medical instruments which transmit various identifying data to the virtual computer model from said instruments which have been selected; then, said apparatus assist in creating full immersion for the user in the virtual reality model by tracking and homing to instruments with haptic, or force feedback generating, receptacles with which said instruments dock by means of a numerical grid, creating a seamless interface of instrument selection and use in the virtual reality anatomy."

U.S. Pat. No. 5,882,206, entitled "Virtual surgery system," that issued to Gillio teaches "A virtual surgery system or virtual testing system provides a simulation or test based on image data. A simulator combined with a real exam requires simulation tasks by a test taker. Additionally, a surgical procedure may be simulated using image data of a patient in devices simulating the physical instruments a surgeon uses in performing the actual procedure, for example. The user input device, such as a mouse, three dimensional mouse, joystick, seven dimensional joystick, full size simulator, etc., can be used in a virtual simulation to move through the image data while the user looks at the data and interaction of the input device with the image data on a display screen. Force feedback can be provided based on physical constraint models (of the anatomy, for example), or based on edge and collision detection between the virtual scope or virtual tool used by the operator and walls or edges of the image data in the image space. The virtual simulator may be used as a teaching, training, testing, demonstration, or remote telesurgery device, for example.

U.S. Pat. No. 5,704,791, entitled "Virtual surgery system instrument," that issued to Gillio teaches "A virtual surgery system or virtual testing system provides a simulation or test based on image data. A simulator combined with a real exam requires simulation tasks by a test taker. Additionally, a surgical procedure may be simulated using image data of a patient in devices simulating the physical instruments a surgeon uses in performing the actual procedure, for example. The user input device, such as a mouse, three dimensional mouse, joystick, seven dimensional joystick, full size simulator, etc., can be used in a virtual simulation to move through the image data while the user looks at the data and interaction of the input device with the image data on a display screen. Force feedback can be provided based on physical constraint models (of the anatomy, for example), or based on edge and collision detection between the virtual scope or virtual tool used by the operator and walls or edges of the image data in the image space. The virtual simulator may be used as a teaching, training, testing, demonstration, or remote telesurgery device, for example."

U.S. Pat. No. 5,739,811, entitled "Method and apparatus for controlling human-computer interface systems providing force feedback," that issued to Rosenberg teaches "A method and apparatus for controlling and providing force feedback using an interface device manipulated by a user. A microprocessor is provided local to the interface device and reads sensor data from sensors that describes the position and/or other information about an object grasped and moved by the user, such as a joystick. The microprocessor provides the sensor data to a host computer that is coupled to the interface device by a communication bus that preferably includes a serial interface. In a "host-controlled" embodiment, the host computer calculates force values using the sensor data and other parameters of a host application program and sends the force values to the local microprocessor, which directly provides the force values to actuators to apply forces to the user object. In a "reflex" embodiment, the host computer sends high level supervisory commands to the local microprocessor, and the microprocessor independently implements a local process based on the high level command for reading sensor data and providing force values to the actuators using sensor data and other parameters."

U.S. Published Patent Application No. 2005/0046629, entitled "Animation method of deformable objects using an oriented material point and generalized spring model," that was published by Jeong et al. teaches "Disclosed is an animation method of deformable objects using an oriented material point and generalized spring model. The animation method comprises the following steps of: modeling a structure of a deformable object into oriented material points and generalized springs; initializing forces and torques acting on the material points, calculating the forces acting on the material points owing to collision of the material points and gravity, calculating the spring forces and torques acting on the material points, obtaining new positions and postures of the material points; updating positions, velocities, postures and angular velocities of the material points based upon physics, and displaying and storing updated results. The oriented material point and generalized spring model of the invention contains the principle of the conventional mass-spring model, but can animate deformable objects or express their structures in more intuitive manner over the conventional mass-spring model. Also, the material point and generalized spring model of the invention can express elongate deformable objects such as hair and wrinkled cloth, which cannot be expressed in the prior art, so as to animate features of various objects."

U.S. Published Patent Application No. 2003/0088389, entitled "Long elements method for simulation of deformable objects," that was published by Balaniuk et al. teaches "Long Elements Method (LEM) for real time physically based dynamic simulation of deformable objects. The LEM is based on a new meshing strategy using long elements whose forms can be straight or arbitrary. The LEM implements a static solution for elastic global deformations of objects filled with fluid based on the Pascal's principle and volume conservation. The volumes are discretised in long elements, defining meshes one order of magnitude smaller than meshes based on tetrahedral or cubic elements. The LEM further combines static and dynamic approaches to simulate the same deformable medium, allowing modeling a three-dimensional internal state at any point inside the deforming medium from a reduced number of explicitly updated elements. Complex elastic and plastic deformations can be simulated in real time with less computational effort. The LEM is particularly useful in real time virtual interactions, soft tissue modeling, and graphic and haptic rendering."

U.S. Published Patent Application No. 2002/0180739, entitled "Method and apparatus for simulating soft object movement" that was published by Reynolds et al. teaches "Movement of a soft body is simulated by defining its surface as an arbitrary mesh of points connected by edges. Each point is represented as a point mass, subject to conventional laws of motion. The simulator represents forces acting on the point masses, namely skin forces connecting pairs of point masses and volumetric forces for maintaining relative positions with no net linear or rotational forces on the soft body."

In a paper entitled "Virtual Reality Vitrectomy Simulator," published by Paul F. Neumann, Lewis L. Sadler, and Jon Gieser M.D. in the Proceedings of the First International Conference on Medical Image Computing and Computer-Assisted Intervention, 1998, pp. 910-917 teaches "In this study, a virtual reality vitrectomy simulator is being developed to assist Ophthalmology residents in correcting retinal detachments. To simulate this type of surgery, a three dimensional computer eye model was constructed and coupled with a mass-spring system for elastic deformations. Five surgical instruments are simulated including: a pick, blade, suction cutter, laser, and drainage needle. The simulator will be evaluated by a group of fellows and retinal surgeons with a subjective Cooper-Harper survey commonly used for flight simulators."

In an IEEE paper entitled "Deformable models: physical based models with rigid and deformable components," published by Demetri Terzopoulous and Andrew Witkin, in *IEEE Computer Graphics and Applications*, November 1988, pp. 41-51 teaches "This article develops an alternative formulation of deformable models. We decompose deformations into a reference component, which may represent an arbitrary shape, and a displacement component allowing deformation away from this reference shape. The reference component evolves according to the laws of rigid-body dynamics. Equations of nonrigid motion based on linear elasticity govern the dynamics of the displacement component. With nonrigid and rigid dynamics operating in unison, this hybrid formulation yields well-conditioned discrete equations, even for complicated reference shapes, particularly as the rigidity of models is increased beyond the stability limits of our prior formulation. We illustrate the application of or deformable models to a physically based computer animation project."

Thus, it is desirable to have a general-purpose interactive material simulation that solves most or all of the problems discussed above.

SUMMARY OF THE INVENTION

In accordance with preferred embodiments of the present invention, some of the problems associated with simulating materials are overcome. A method and system for simulation, display, and interaction with materials is provided.

A method and system for drawing, displaying, editing animating, simulating and interacting with one or more virtual polygonal, spline, volumetric models, three-dimensional visual models or robotic models. The method and system provide flexible simulation, the ability to combine rigid and flexible simulation on plural portions of a model, rendering of haptic forces and force-feedback to a user.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 2 is a flow diagram illustrating a method for simulating rigid, semi-rigid, and flexible components of materials;

FIGS. 16A-16D are a flow diagram illustrating a method for simulating rigid, semi-rigid, and flexible components of materials and models;

FIG. 17 is a flow diagram illustrating a method for simulating rigid, semi-rigid, and flexible components of materials and models;

FIG. 18 is a flow diagram illustrating a method for simulating rigid, semi-rigid, and flexible components of materials and models.

DETAILED DESCRIPTION OF THE INVENTION

Figure 1A:
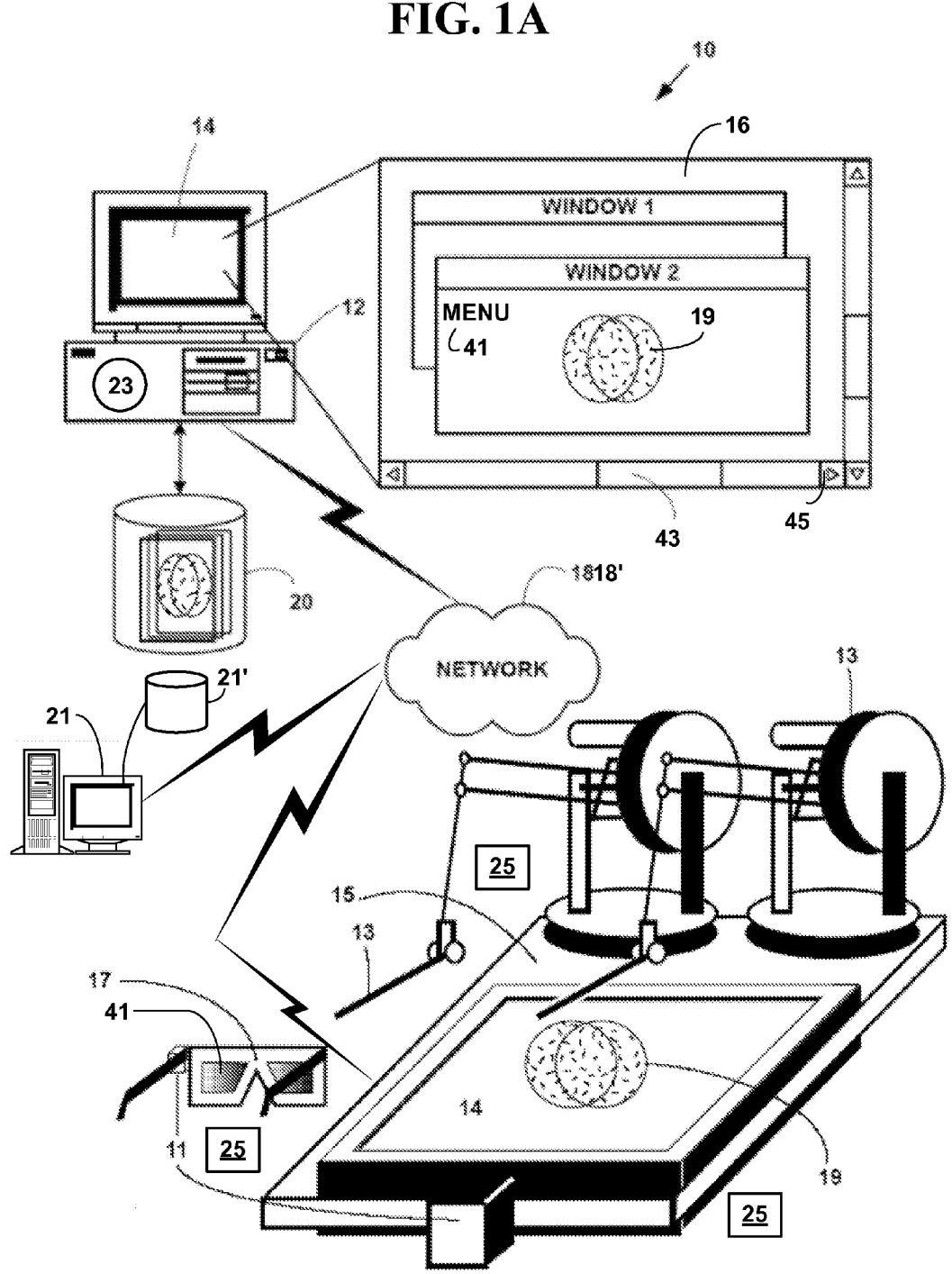
FIG. 1A is a block diagram of an exemplary simulation system.
Figure 15:
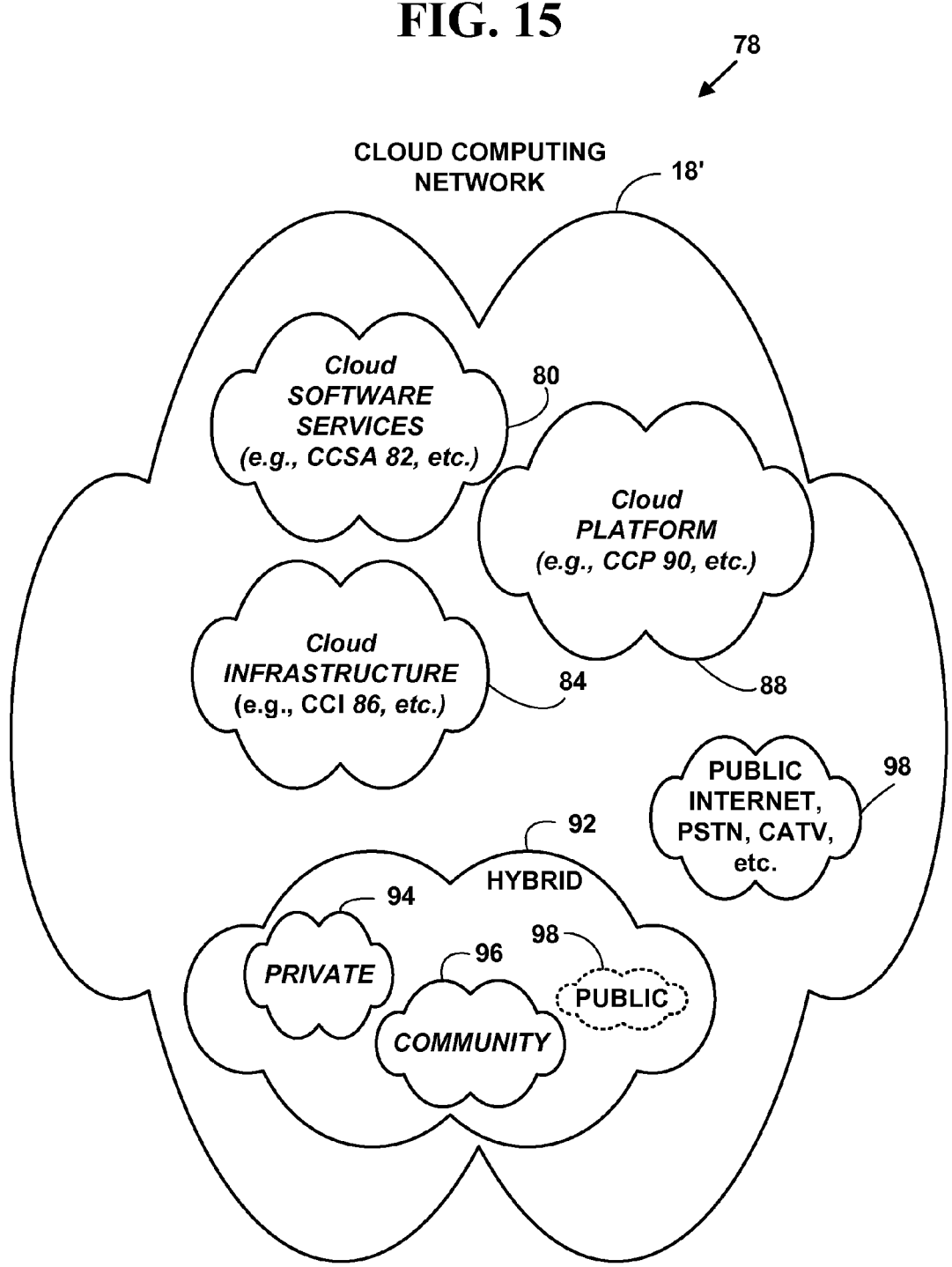
FIG. 15 is block diagram illustrating an exemplary cloud communications network.

FIG. 1A is a block diagram illustrating an exemplary simulation system 10. The exemplary system 10 includes one or more network devices 12 each with one or more processors or central processing units (CPUs), an application 23 and one or more displays 14 (two of which are illustrated). The display 14 may include any of a windowed graphical user interface ("GUI") 16 with multiple windows, or one or more simulation views 19, to a user. One or more databases 20 (one of which is illustrated) include data in various digital data formats. The databases 20 may be integral to a memory system on the network device 12 or in secondary storage such as a hard disk, floppy disk, optical disk, or other non-volatile mass storage devices. The network device 12 and the databases 20 may be in communications with and accessible via one or more communications networks 18 including a cloud communications network 18' (FIG. 15).

The network devices 12 are in communications with a cloud communications network 18' via one or more wired and/or wireless communications interfaces. The cloud communications network 18', is also called a "cloud computing network" herein and the terms may be used interchangeably.

The simulation system 10 further includes tracking devices 11 may be connected to the one or more network devices 12. Stereoscopic glasses 17 and tracked devices 11 may be worn by a user. Position-tracking devices 13 (e.g. haptic devices etc.) are connected to one or more network devices 12. (Position-tracking and haptics may be embodied in the same device, or a position-tracking device can be used in place of a haptic device.) As is known in the simulation arts, a haptic device 13 allows a user to interact with a network device 12 by receiving tactile feedback. The haptic devices 13, display 14, and tracking devices 11 are physically connected and fixed at specific distances and orientations with respect to each other using a rigid harness 15.

The one or more network devices 12 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV), satellite television (SATV) and Internet television set-top boxes, digital televisions including high definition television (HDTV), three-dimensional (3DTV) televisions and other types of network devices.

The one or more network devices 12 include smart phones such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Andriod is an open source operating system platform backed by Google, along with major hardware and software developers (such as Intel, HTC, ARM, Motorola and Samsung, etc.), that form the Open Handset Alliance.

The one or more network devices 12 include tablet computers such as the iPad, by Apple, Inc., the HP Tablet, by Hewlett Packard, Inc., the Playbook, by RIM, Inc., the Tablet, by Sony, Inc.

The one or more network 12 may communicate with other network devices with near field communications (NFC) and/or machine-to-machine (M2M) communicaitons.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as haptic movement, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

The tracking and tracked devices 11 and haptic or position-sensing devices 13 may be connected to one or more network devices 12 via USB or its variants, IEEE 1394/FireWire, serial, parallel, PCI, PCI-express or other card, or other wired or wireless methods of connectivity.

The tracking and tracked devices 11 and haptic or position-sensing devices 13 may operate using wired or wireless electrical, mechanical, electromechanical, magnetic, solid-state or other technologies not limited to magnets, magnetic fields, lenses and other optics, light-emitting diodes, filters, visible-spectrum and infrared light, lasers, motors, gears, sensors, encoders, and transducers, combined with other methods not limited to analog-to-digital converters, data-transmission protocols and operating-system and application software layers.

Stereoscopic glasses 17 may operate using linear or circular polarization filters, colored lenses, LCD shutters, or other means. Glasses may also be absent from the system entirely. In this case, stereoscopy can still be achieved if the computer display 14 uses an autostereoscopic technology, such as barrier-strips.

Audio speakers 25 (three of which are illustrated) in FIG. 1A allow audio display of haptic information. Three or more audio speakers allow audio display of three-dimensional and two-dimensional haptic information. More speakers are required for displaying higher-dimensional information (e.g., 4 speakers for 4D, etc.).

Figure 1B:
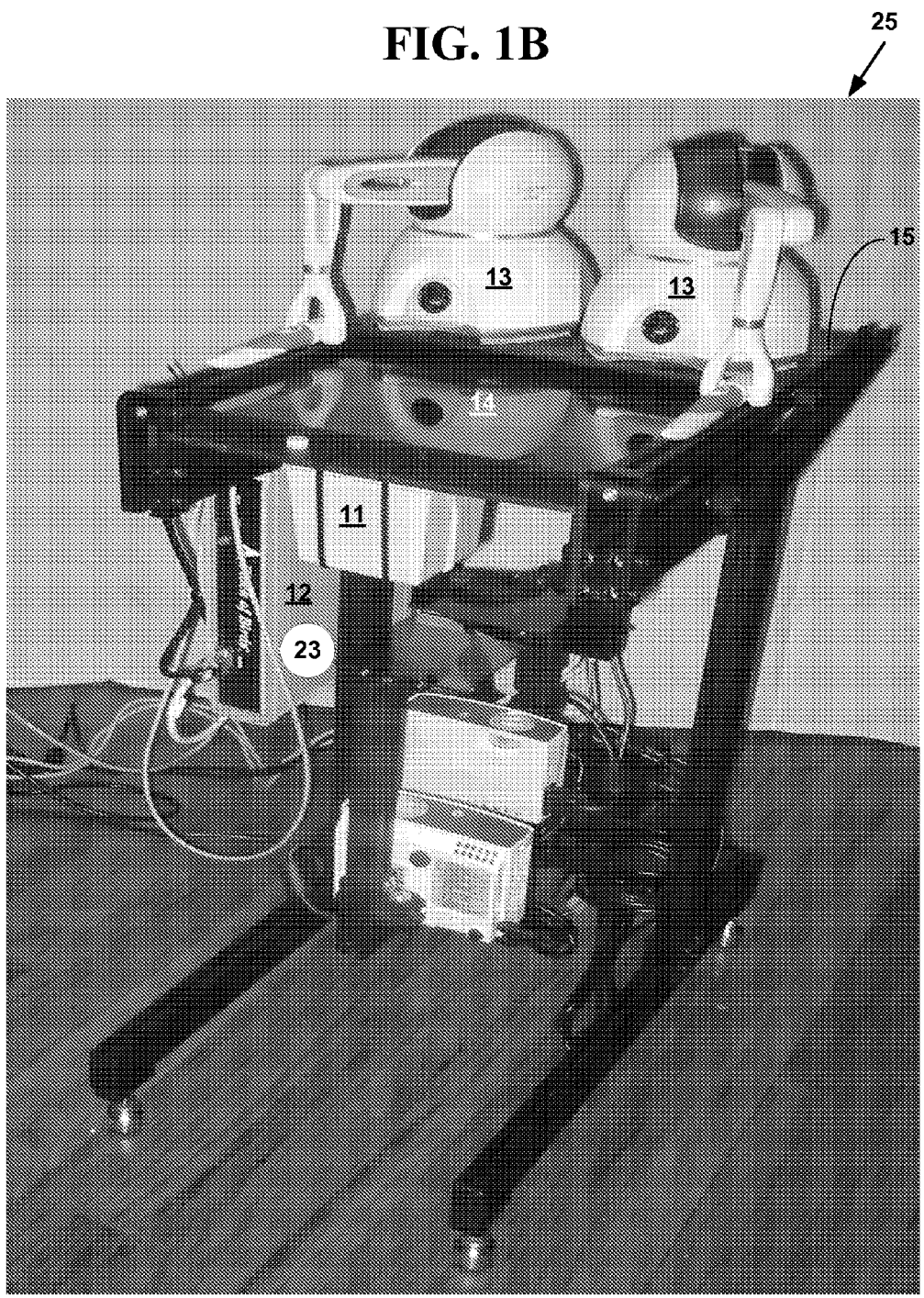
FIG. 1B is a digital photograph illustrating a portion of an actual exemplary simulation system.

FIG. 1B is a block diagram illustrating a digital photograph 27 of a portion of an actual exemplary simulation system 10. This digital photograph 27 does not illustrate one or more network devices 12.

The zero or more communications networks 18 may include, but are not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 18.

The communications networks 18 may include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

The communications network 18 may include one or more servers 21 and one or more web-sites accessible by users to send and receive information useable by the one or more network devices 12. The one or more servers, may also include one or more associated databases for storing electronic information.

Preferred embodiments of the present invention devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum. However, network devices based on other standards could also be used.

The communications networks 18 may include a layered architecture. As is known in the art, the Open Systems Interconnection (OSI) reference model is one layered architecture that standardizes levels of service and types of interaction for computers exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

The layered architecture may also include an Internet layered architecture comprising a physical layer, a data-link layer, a network layer comprising the Internet Protocol (IP) transport layer comprising the Transmission Control Protocol (TCP) or User Datagram Protocol (UDP), and an application layer. However, the present invention is not limited to this embodiment and architectures can also be used to practice the invention.

The communications networks 20 may include, but is not limited to, data networks using the Transmission Control Protocol (TCP), User Datagram Protocol (UDP), Internet Protocol (IP) and other data protocols. The communications network 18 may also include a public or private bus (e.g., USB, etc.) or be connected directly via wired or wireless connections.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is know in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 19 and the present invention is not limited to TCP/UDP/IP.

An operating environment for devices and interfaces of the present invention include a processing system with one or more high speed Central Processing Unit(s) (CPU), zero or more high speed Graphical Processing Unit(s) (GPU), zero or more high speed audio processing unit(s) (APU), or other processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed", "GPU executed", "APU executed", or "processor executed."

It will be appreciated that acts and symbolically represented operations or instructions include the manipulation of electrical signals by the CPU, GPU, APU, or other processor(s). An electrical system represents data bits which cause a resulting transformation or reduction of the electrical signals, and the maintenance of data bits at memory locations in a memory system to thereby reconfigure or otherwise alter the processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory (RAM)) or non-volatile (e.g., Read-Only Memory (ROM)) mass storage system readable by the CPU, GPU, APU, or other processor(s). The computer readable medium includes cooperating or interconnected computer readable medium, which exist exclusively on the processing system or be distributed among multiple interconnected processing systems that may be local or remote to the processing system.

In one embodiment of the invention, the communications networks 20 include wireless and wired interfaces. The wired and wireless interfaces may include security features.

The wired interfaces include wired interfaces and corresponding networking protocols for wired connections to the Public Switched Telephone Network (PSTN) or a cable television network (CATV) including HDTV that connect the network devices 12 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others.

In one embodiment of the present invention, the wireless interfaces include but are not limited to, an IEEE 802.11a, 802.11b, 802.11g, 802.11n, 802.15.4 (ZigBee), 802.16a, 802.16g, "Wireless Fidelity" (Wi-Fi), "Worldwide Interoperability for Microwave Access" (WiMAX), ETSI High Performance Radio Metropolitan Area Network (HIPERMAN) "RF Home," Bluetooth or other types of wireless interfaces. However, the present invention is not limited to such wireless interface and other types of wireless interfaces can also be used.

In another embodiment of the present invention, the wireless mesh network device 14, 16, 18, 22 includes a wireless sensor device that comprises an integral or separate Bluetooth and/or infra data association (IrDA) module for wireless Bluetooth or wireless infrared communications.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is a type of 802.11 xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz ISM band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX (and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX (hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

As is known in the art, Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

Security and Encryption

Devices and interfaces of the present invention may include security and encryption for secure communications and secure recording, transmission and display of medical information. Privacy is required for certain types of medical information collected, stored and displayed for medical patients. For example, in association with the Health Insurance Portability and Accountability Act of 1996 (HIPAA), the U.S. Department of Health and Human Services (HHS) issued the regulations *Standards for Privacy of Individually Identifiable Health Information*. For most covered entities, compliance with these regulations, known as the "Privacy Rule," was required as of Apr. 14, 2003). The security and encryption described herein is used to protect such privacy and other types of medical patient privacy.

Devices and interfaces of the present invention may include security and encryption for secure communications. Wireless Encryption Protocol (WEP) (also called "Wired Equivalent Privacy) is a security protocol for WiLANs defined in the IEEE 802.11b standard. WEP is cryptographic privacy method, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One other problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11x WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption method as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption methods between wireless access points and wireless devices. The authentication schemes proposed in the draft standard include Extensible Authentication Protocol (EAP). One proposed encryption method is an Advanced Encryption Standard (AES) encryption method.

Dynamic negotiation of authentication and encryption methods lets RSN evolve with the state of the art in security, adding methods to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher method. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption method that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption methods.

Secure Hash Method (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Method (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 method is intended for digital signature applications, where a large file must be "compressed" in a secure manner before being encrypted with a private (secret) key under a public-key cryptosystem such as RSA. The IETF RFC-1321, entitled "The MD5 Message-Digest Method" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC) is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digistal signatures. The security method are negotiated between the source and destignation at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

Material Simulation Method

FIG. 2 is a flow diagram illustrating a method for simulating rigid, semi-rigid, and flexible components of materials. At Step 24, positions of an entity, and optionally any of orientations, velocities, and accelerations, are obtained from a predetermined model. At Step 26, plural forces and optionally torques are calculated on the entity using any of the obtained or previously calculated positions, orientations, velocities, and accelerations. The plural forces and torques may be calculated from the combined effects of any of gravity, friction, interaction with other entities, interactions within a single entity, collision with other entities, interaction with objects controlled by a user holding, wearing, or manipulating a haptic or other device, or other forces, these forces affecting the combined rigid and flexible components of the entity. At Step 28, one or more positions, velocities, and optionally accelerations of the entity are calculated using the previously calculated plural forces, and optionally, torques. At Step 30, the calculated one or more positions, and optionally any of velocities and accelerations of the entity are used to display a two-dimensional (2D) or three dimensional (3D) simulated view of a representation of the entity or sub-portion thereof. The 2D or 3D simulated view may include a view of the components of the entity. Steps 26-30 are repeated as many times as necessary.

Method 22 is illustrated with one exemplary embodiment. However, the present invention is not limited to such an embodiment and other embodiments can also be used to practice the invention.

In one exemplary embodiment, the following notation illustrated in Table 1 is used. However, the present invention is not limited to such an embodiment and other embodiments can also be used to practice the invention.

TABLE 1

Notation
Vectors are in bold and scalars are in italics.
Some scalars may also be vectors in other embodiments.

$L$ refers to a spring's current length
$L_0$ refers to a spring's rest length
$c$ refers to a spring's damping
$k$ refers to a spring's stiffness
$m$ refers to a component's mass
$m_i$ is the mass of the body's $i^{th}$ component
$m_r$ is the body's rigid mass
$n$ is the number of components belonging to the body
$r$ refers to a component's force-transmission value
$t$ is the simulation time-step
$trans_i$ is the force-transmission value of the body's $i^{th}$ component
$trans_r$ is the body's force-transmission value
$\mu_s$ is the coefficient of static friction
$\mu_k$ is the coefficient of kinetic friction
G is the gravity vector: $\{0, -9.8, 0\}$
$\mathbf{I}^{-1}$ is the inverse of the body's inertia tensor
L is the body's vector angular momentum
L in the context of an orientation-preserving spring, the spring's current orientation and length
$\mathbf{L_0}$ an orientation-preserving spring's rest orientation and length
$\hat{\mathbf{L}}$ refers to a spring's unitized current direction
$\mathbf{f}_i$ is the vector force acting on the body's $i^{th}$ component
$\hat{\mathbf{t}}_x$ is the unit-vector x-axis of the body's orthonormal basis reference frame
$\hat{\mathbf{t}}_y$ is the unit-vector y-axis of the body's orthonormal basis reference frame
$\hat{\mathbf{t}}_z$ is the unit-vector z-axis of the body's orthonormal basis reference frame
$\boldsymbol{\tau}$ is the vector torque acting on the body
$\boldsymbol{\tau}_i$ is the vector torque acting on the body's $i^{th}$ component
$\hat{\mathbf{v}}$ is a unitized vector
$\boldsymbol{\omega}$ is the body's vector angular velocity
$\dot{\boldsymbol{\omega}}$ is the body's vector angular acceleration
$\boldsymbol{\omega}(t)$ is the body's current vector angular velocity
$\boldsymbol{\omega}(t - \Delta t)$ is the body's vector angular velocity at the previous time-step
$\mathbf{x}_i$ is the vector position of the body's $i^{th}$ component
$\mathbf{x}_r$ is the vector position of the body's center of mass
$\mathbf{x}_i^{body}$ is the vector position of the body's $i^{th}$ component relative to $\mathbf{x}_r$ TABLE 1-continued Notation
Vectors are in bold and scalars are in italics.
Some scalars may also be vectors in other embodiments.

$\mathbf{x}_i^{ref}$ is the vector position of the body's $i^{th}$ component in the body's $uvw$ space
$\mathbf{x}_i^{undeformed}$ is the vector position of the undeformed body's $i^{th}$ component
$\mathbf{x}_r^{undeformed}$ is the vector position of the undeformed body's center of mass
$\dot{\mathbf{x}}_i$ is the vector velocity of the body's $i^{th}$ component without angular velocity
$\dot{\mathbf{x}}_r$ is the vector velocity of the body's center of mass
$\dot{\mathbf{x}}_i^{body}$ is the vector velocity of the body's $i^{th}$ component relative to $\dot{\mathbf{x}}_r$
$\ddot{\mathbf{x}}_i^f$ is the deformable vector acceleration of the body's $i^{th}$ component
$\ddot{\mathbf{x}}_i^r$ is the rigid vector acceleration of the body's $i^{th}$ component without angular acceleration
$\dot{\mathbf{x}}_i^\omega$ is the vector angular velocity of the body's $i^{th}$ component, converted to linear velocity
$\ddot{\mathbf{x}}_i^{centrifugal}$ is the vector acceleration of the body's $i^{th}$ component due to centrifugal forces
$\ddot{\mathbf{x}}_i^{coriolis}$ is the vector acceleration of the body's $i^{th}$ component due to coriolis forces
$q(\hat{\omega}, |\omega|)$ is a unit quaternion representing rotation by the vector angular velocity
$s_i^{index1}$ is the body's $index1^{th}$ component connected to its $i^{th}$ orientation-preserving spring
$s_i^{index2}$ is the body's $index2^{th}$ component connected to its $i^{th}$ orientation-preserving spring
$\mathbf{s}_i^{L0}$ is the vector rest-length of the body's $i^{th}$ orientation-preserving spring As is known in the art, a dashpot is a pneumatic device such as a piston assembly, or other similar device whose motion is dependent on the flow characteristics of a fluid to which a force has been applied. A spring is an elastic device that flexes when a force is applied to it and returns to its original shape when the force is released. Spring and dashpot models may be used herein to simulate materials.

In such an exemplary embodiment, at Step 24, an initial set of (x,y,z) positions and other characteristics of an entity to be simulated using a spring-and-dashpot model are obtained. In one embodiment the initial set of positions is obtained from a commercial modeling software package. However, the present invention is not limited to obtaining a set of initial (x,y,z) positions and other characteristics from a commercial modeling software package, and other methods can also be used to obtain the initial positions and characteristics of the entity, including, but not limited to, generation of the positions and characteristics using a programmatically-defined method, specification of the positions and characteristics using data gathered from a scanning device such as an MRI, CT, or laser scanner, specification of the positions and characteristics via user interaction, user inputs or a combination thereof of methods.

As is known in the simulation arts, a haptic interface is a device which allows a user to interact with a computer by receiving tactile feedback. This feedback is achieved by applying one or more degrees of force to a device held or worn by the user, at one or more points on the device, along any of the x, y, and z axes, and optionally one or more torques, each about an axis of rotation at a point on the device. There are two main types of haptic devices: devices that allow a user to "touch" and manipulate objects in three dimensions (3D), and devices that allow users to "feel" the textures of 2D objects. 3D haptic devices are more often used for surgical and other types of simulations, in robotic applications (e.g., remote operation in hazardous environments), and in videogames.

Velocities, optionally accelerations, and zero or more other quantities are calculated or obtained for each of the components. In one exemplary embodiment, Step 24 includes the steps illustrated in Table 2. However, the present invention is not limited to such an exemplary embodiment and more, fewer and other steps and other embodiments can also be used to practice the invention.

TABLE 2

1. Read a model's data, including vertex positions, polygons, and vertex colors, from a data file exported from a modeling software package.
2. Create a body composed of components whose positions are at the vertices of the model.
3. Use the unclamped vertex color values (Red, Green, Blue, and Alpha) to assign these properties to each of the components:
    a. Red value = mass
    b. Green value = spring stiffness (k)
    c. Blue value = spring damping (c)
    d. Alpha value = force-transmission
4. Create an internal orientation-preserving spring for each polygon-edge, unless the edge's end-vertices both have force-transmission values of 1; in this case, the vertices are rigidly coupled, and internal spring forces will have no effect, so no spring is created. Assign a stiffness value to each orientation-preserving spring as an average of the spring's two end components' stiffnesses, $$\frac{k1 + k2}{2},$$

increased in proportion to the average force-transmission, $$\frac{r1 + r2}{2},$$

using the formula:

$$\frac{\frac{k1 + k2}{2}}{1 - \frac{r1 + r2}{2}}.$$

Next, assign the spring's damping. The damping value of each end component represents a critical-damping ratio, where 0 is undamped, 1 is critically-damped, and >1 is overdamped. Average the two components' associated damping values, $$\frac{c1 + c2}{2}.$$

Calculate the critical damping value with respect to the components' reduced mass, $$\sqrt{4k \frac{m1 m2}{m1 + m2}}.$$

and assign the spring's actual damping value using the formula:

$$\frac{c1 + c2}{2} \sqrt{4k \frac{m1 m2}{m1 + m2}}.$$

In an alternate embodiment, do a weighted average of the k, c, and r values using the sizes of the components' relative masses.
5. Calculate the body's center of mass.
6. Assign the body a default orthonormal basis reference frame using the word-coordinate x, y, and z axes.
7. Calculate each component's position in the default reference frame, or its uvw coordinates, by computing its position minus the center of mass's position.
8. Create velocities and optionally accelerations for each component by initializing them to zero, or by specifying them interactively, or manually, or a pre-determined automated method, or by another method.
9. Repeat steps 1-8 as many times as there are bodies.

At Step 26, plural forces and optionally torques are calculated on the entity using any of the obtained or calculated positions, orientations, velocities and accelerations. The plural forces may include forces from any of gravity, friction, interaction with other moving or nonmoving entities, interactions originating from within an entity, collisions with other entities, collisions within an entity, interaction with entities controlled by a user holding, wearing, or in any way manipulating a haptic or other device, or other forces. These forces affect the combined rigid and flexible components of the entity simultaneously.

In one exemplary embodiment, Step 26 includes one or more of the forces illustrated in Table 3. However, the present invention is not limited to such an exemplary embodiment and other embodiments can also be used to practice the invention.

TABLE 3

1. Add forces and torques:
  a. Gravity: $f_i = G\, m_i$ and $\tau_i = x_i^{body} \times f_i$
  b. Bounding plane: e.g., if $x_i <$ floorheight, apply
     $f_i = -k\, (\text{floorheight} - x_{iy}) - c\, \dot{x}_{iy}$, in the negative y-direction, and
     $\tau_i = x_i^{body} \times \{0, -f, 0\}$. There are six planes implemented: a floor, a ceiling, and four walls, each oriented along a positive or negative x, y, or z axis.
  c. Coulomb friction for the floor: if $x_i <$ floorheight, compute
     $f_{normal} = f_i \cdot \{0, 1, 0\}$. If $f_{normal} > 0$, compute $\dot{x}_{tangent} = \{\dot{x}_{ix}, 0, \dot{x}_{iz}\}$.
     If $|\dot{x}_{tangent}| < 1/10$, apply $f_i = \mu_s\, f_{normal}\, \dot{x}_i$. Otherwise, apply $f_i = \mu_k\, f_{normal}\, \dot{x}_i$. In both cases, $\tau_i = x_i^{body} \times f_i$.
  d. Constant: $f_i = f_{constant}$ and $\tau_i = x_i^{body} \times f_i$.

TABLE 3-continued e. Tangent: $v = \{0, 0, 1\} \times x_i^{body}$, $f_i = \hat{v}$ magnitude, and $\tau_i = x_i^{body} \times f_i$.
  f. Spring: $f_i = \hat{L}\, (-k\, (L - L_0) - c\, (\dot{x}_s^{index2} - \dot{x}_s^{index1}))$ and $\tau_i = x_i^{body} \times f_i$, applied positively to one end component and negatively to the other.
  g. Internal Orientation-Preserving Spring:
     $f_i = (-k\, (L - L_0) - c\, (\dot{x}_s^{index2} - \dot{x}_s^{index1}))$, applied positively to one end component and negatively to the other, and $\tau_i = 0$.
  h. External Orientation-Preserving Spring:
     $f_i = (-k\, (L - L_0) - c\, (\dot{x}_s^{index2} - \dot{x}_s^{index1}))$ and $\tau_i = x_i^{body} \times f_i$, applied positively to one end component and negatively to the other.
  i. Haptics: When the user's effector touches a body, temporary external orientation-preserving springs are created between the user's effector-position and components near the point of contact. The springs move the body and provide force-feedback to the user.

At Step 28, one or more of any of positions, orientations, velocities, and accelerations are calculated for the entity using the calculated plural forces.

Figure 3:
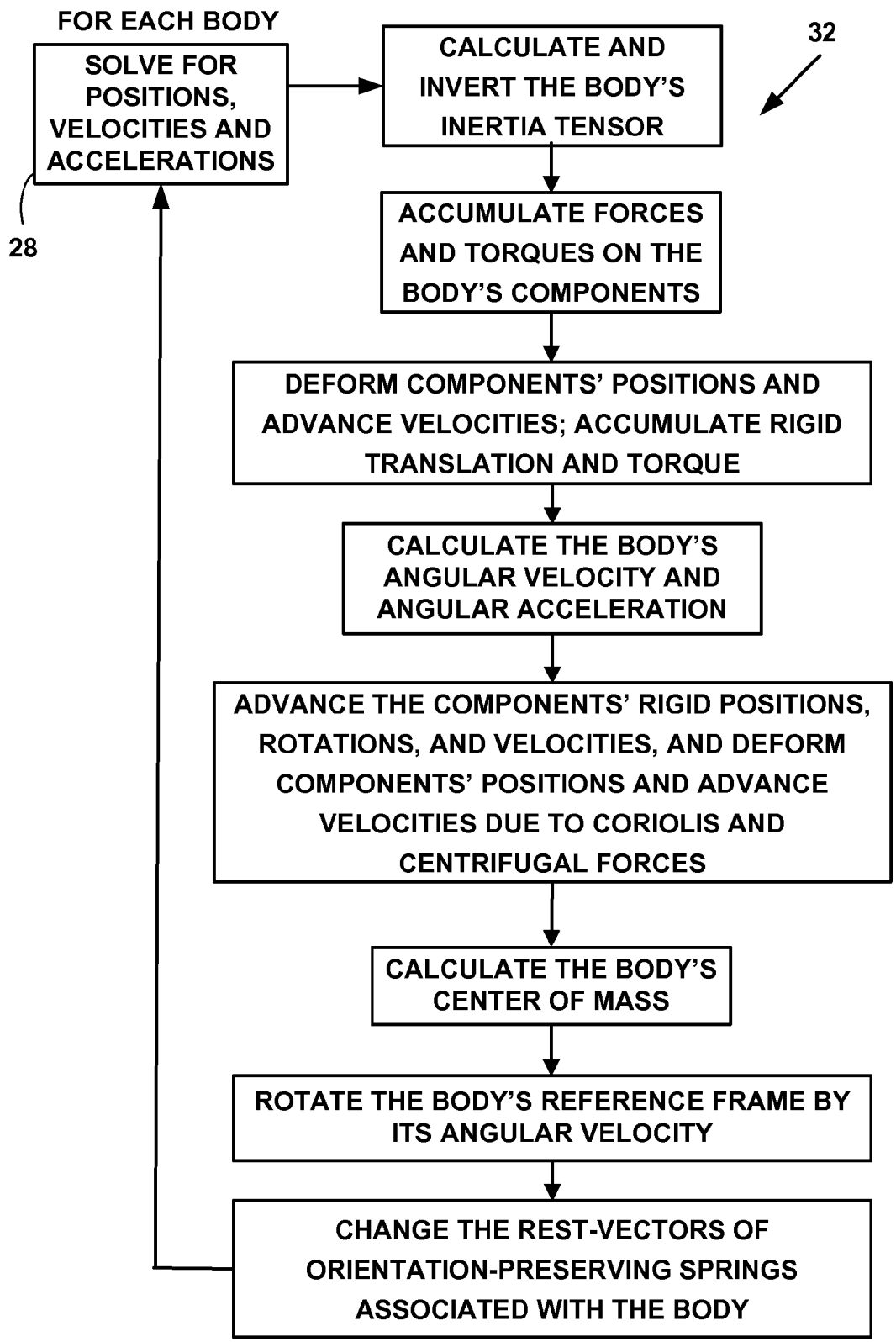
FIG. 3 is a flow diagram illustrating an exemplary method used for Step 28 of the Method of FIG. 2.

FIG. 3 is a flow diagram illustrating an exemplary Method 32 used for Step 28 of Method 22 of FIG. 2. However, the present invention is not limited to using Method 32 and more, fewer and steps and other methods or steps can be used to practice Step 28.

In one exemplary embodiment, the Method 32 includes the steps illustrated in Table 4. However, the present invention is not limited to such an exemplary embodiment, and more, fewer, and other steps and other embodiments can also be used to practice the invention.

TABLE 4

1. Deform components' positions and advance velocities of an entity including a body; accumulate the body's rigid translation and torque.

| Equation | Description |
| --- | --- |
| $m_r = \sum_{1}^{m} m_i \text{trans}_i$ | calculate the rigid portion of the body's mass |
| $\ddot{x}_i^f = \dfrac{f_i}{m_i}(1 - \text{trans}_i)$ | calculate the acceleration of each component due to deformation |
| $\ddot{x}_i^r = \dfrac{f_i}{m_r}\text{trans}_i$ | calculate the rigid acceleration of each component |
| $\Delta x_i = \dot{x}_i t + \dfrac{1}{2}\ddot{x}_i^f t^2$ | calculate the change in position of each component due to deformation |
| $\Delta \dot{x}_i = \ddot{x}_i^f t$ | calculate the change in velocity of each component due to deformation |
| $\Delta x_r = \sum_{1}^{n} \dfrac{1}{2}\ddot{x}_i^r t^2$ | calculate the body's change in position for use later |
| $\Delta \dot{x}_r = \sum_{1}^{n} \ddot{x}_i^r t$ | calculate the body's change in velocity |
| $\tau = \sum_{1}^{n} \tau_i$ | calculate the torque on the body |

2. Calculate the body's angular velocity and angular acceleration.

| Equation | Description |
| --- | --- |
| $\text{trans}_r = \dfrac{\sum_{1}^{n} m_i \text{trans}_i}{\sum_{1}^{n} m_i}$ | calculate the force-transmission of the body as a ratio in the range 0-1 |
| $\Delta L = \tau\, \text{trans}_r\, t$ | calculate the body's change in angular momentum |

TABLE 4-continued $\omega = I^{-1} L$      calculate the body's angular velocity
$\dot{\omega} = \omega(t) - \omega(t - \Delta t)$      calculate the body's angular acceleration, for use later 3. Advance the components' rigid positions, rotations, and velocities, and deform components' positions and advance velocities due to coriolis and centrifugal forces.

Figure 4:
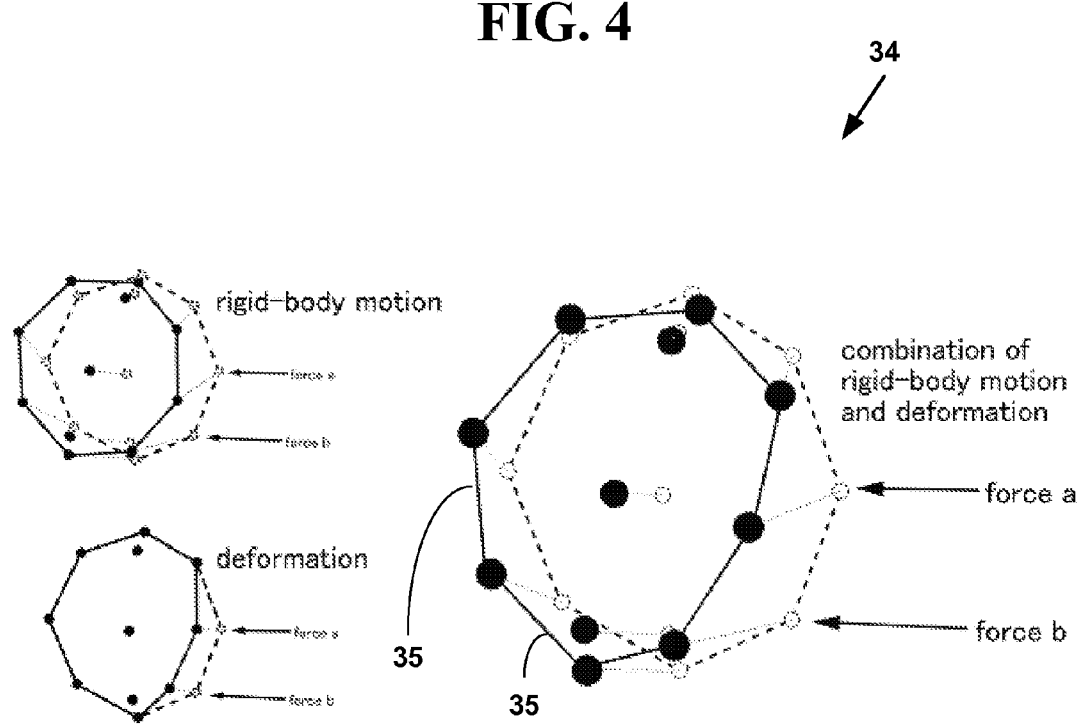
FIG. 4 is a block diagram illustrating a combination of rigid-body motion and deformation to a simulated body.

$x_i^{body} = x_i - x_r$      calculate the position of each component relative to the center of mass
$\dot{x}_i^{body} = \dot{x}_i - \dot{x}_r$      calculate the velocity of each component relative to the center of mass
$\dot{x}_i^{\omega} = \omega \times x_i^{body}$      calculate the angular velocity of each component as linear velocity
$\ddot{x}_i^{centrifugal} = \omega \times x_i^{body} + \omega \times \dot{x}_i^{\omega}$      calculate the centrifugal acceleration of each component
$\ddot{x}_i^{coriolis} = 2(\omega \times \dot{x}_i^{body})$      calculate the coriolis acceleration of each component calculate the change in position of each component due to the body's change in position, the centrifugal and coriolis accelerations, and the body's angular velocity $$\Delta x_i = \Delta x_r \text{trans}_i - \frac{1}{2}\left(\ddot{x}_i^{centrifugal} + \ddot{x}_i^{coriolis}\right)(1 - \text{trans}_i)t^2 + q(\hat{\omega}, |\omega|)x_i^{body} - x_i^{body}$$

calculate the change in velocity of each component due to the body's change in velocity and the centrifugal and coriolis accelerations $\Delta \dot{x}_i = \Delta \dot{x}_r \text{trans}_i - (\ddot{x}_i^{centrifugal} + \ddot{x}_i^{coriolis})(1 - \text{trans}_i)t$ 4. Change the body's orientation-preserving spring rest vectors.

$$x_r = \frac{\sum_{1}^{n} x_i m_i}{\sum_{1}^{n} m_i}$$
     calculate the position of the body's center of mass $x_i^{ref} = x_i^{undeformed} - x_r^{undeformed}$      recalculate each component's uvws if plastic deformation, contraction, extension, denting, bending, stretching, or other shape-change is required use each component's position relative to the center of mass . . .
$x_i^{body} = \hat{f}_x(x_i^{ref})_u + \hat{f}_y(x_i^{ref})_v + \hat{f}_z(x_i^{ref})_w$
. . . to calculate the rest length and orientation of each orientation-preserving spring
$s_i^{L0} = x_{s_i \text{index2}}^{body} - x_{s_i \text{index1}}^{body}$ FIG. 4 is a block diagram 34 illustrating a combination of rigid-body motion and deformation to a simulated body. Forces impact the rigid-body motion and the deformation of the simulated body simultaneously. Dashed bold dots and lines represent the body before forces have been applied and solid bold dots and lines represent the body after the forces have been applied. According to the laws of physics, the method conserves the body's physical properties (including linear and angular momentum) in the absence of external forces. The simulated body or entity has plural individual components 35.

Figure 5:
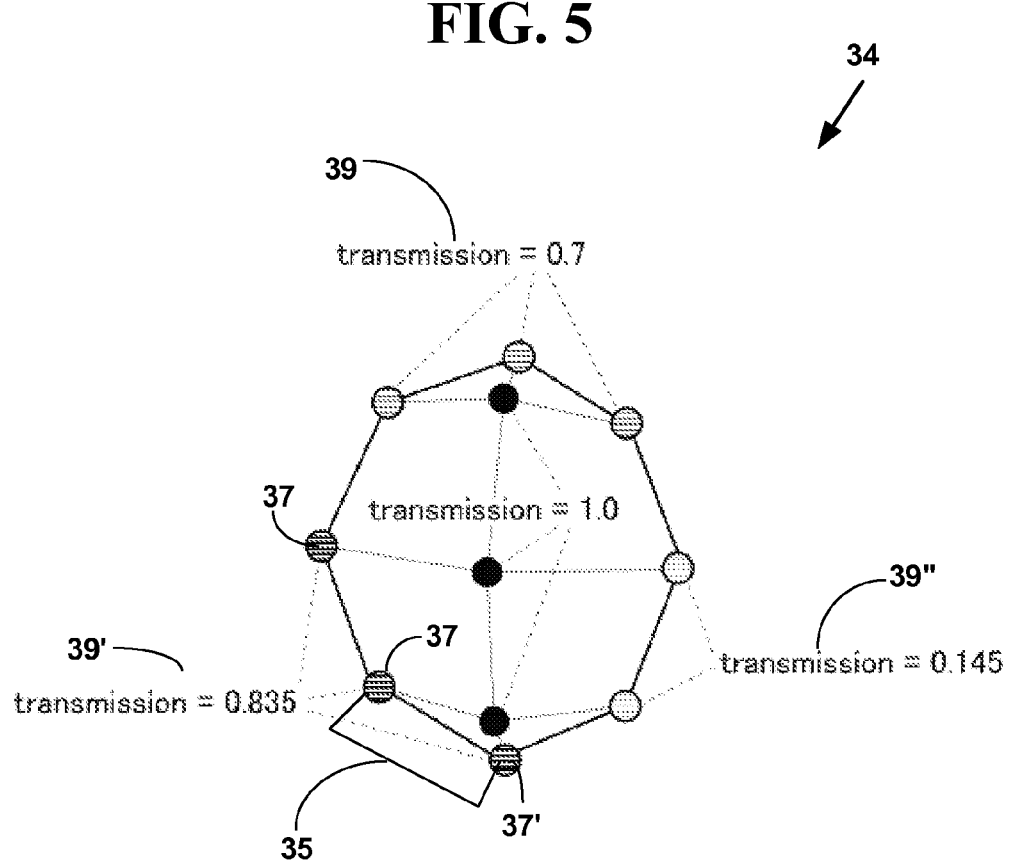
FIG. 5. is a block diagram illustrating a simulated body composed of components with associated masses.

FIG. 5 is a block diagram 36 illustrating a simulated body composed of components with associated masses. A simulated body is composed of plural components, each component 35 having an associated parameterized force-transmission value. The components 35 include one or more points 37 that also have an associated parameterized force-transmission value 39 that can vary from fully rigid, to fully flexible and anything in between point-to-point 37.

Figure 6:
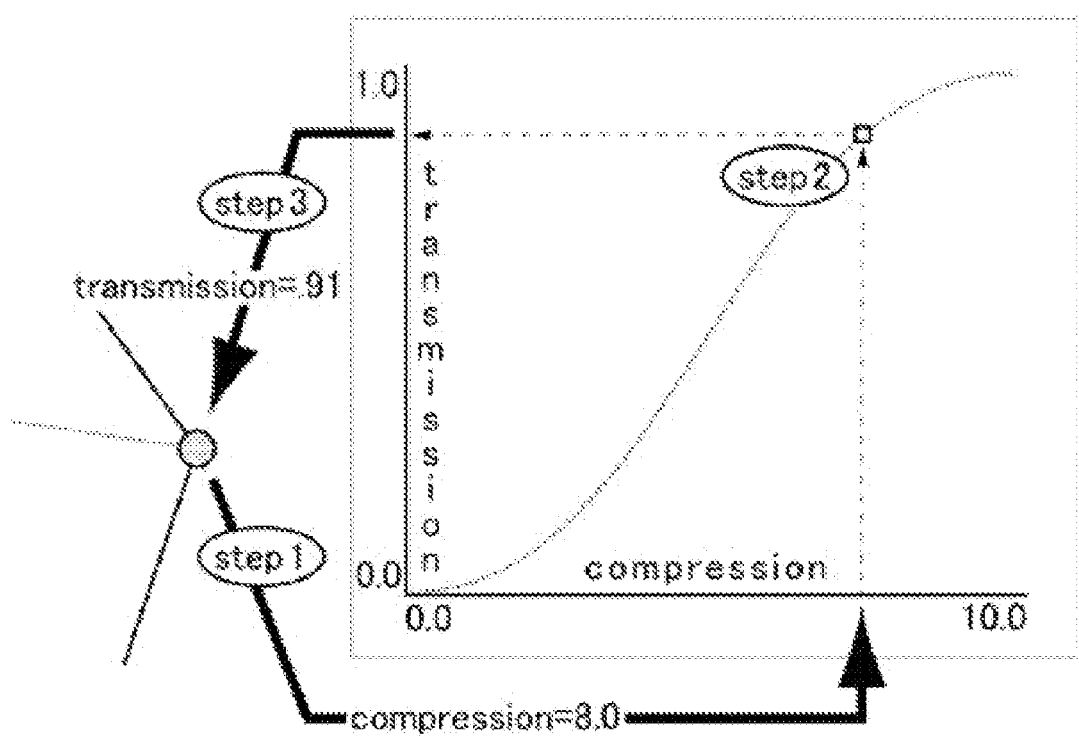
FIG. 6 is a block diagram illustrating changes in a component's force-transmission value.

FIG. 6 is a block diagram 38 illustrating changes in a component's 35 force-transmission value 39. In Step 1, a time-varying parameter's value is used as input to a specified function. In Step 2, the function's value is calculated. In Step 3, the transmission value is affected by an output of the function.

Figure 7:
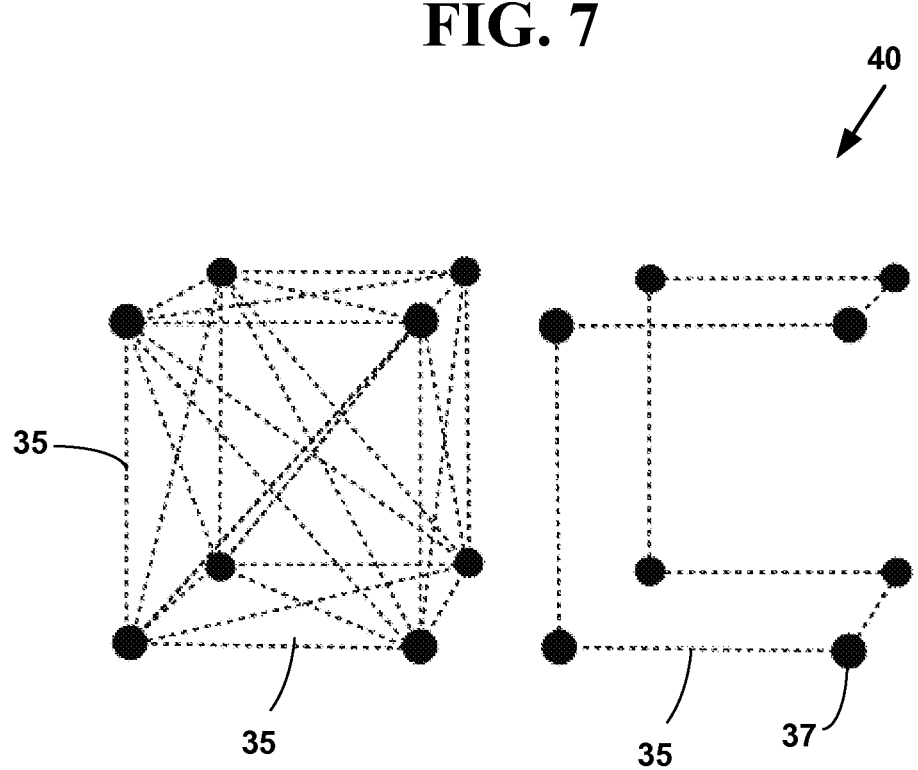
FIG. 7 is a block diagram illustrating standard or orientation-preserving springs that can be used to model a deformable body.

FIG. 7 is a block diagram 40 illustrating standard or orientation-preserving springs that can be used to model a deformable body.

Figure 8:
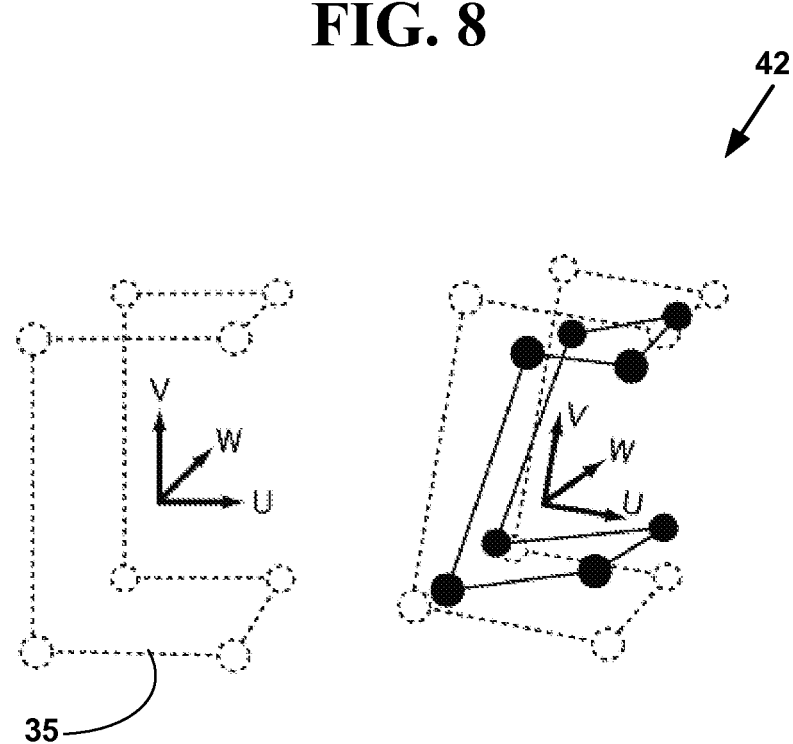
FIG. 8 is a block diagram illustrating a body's local coordinate system or UVW space.

FIG. 8 is a block diagram 42 illustrating a body's local coordinate system or UVW space. The global coordinate system is referred to as "world space." A body's components' 35 locations in UVW space are generally different from the body's components' locations in world space. The components in world space move and deform. The components in UVW space generally do not. The components in UVW space are used to specify both a body's undeformed shape and the rest lengths and orientations of its springs. The solid dots and lines in the rightmost drawing illustrate a deformed body in world space superimposed over the undeformed body in UVW space.

Figure 9:
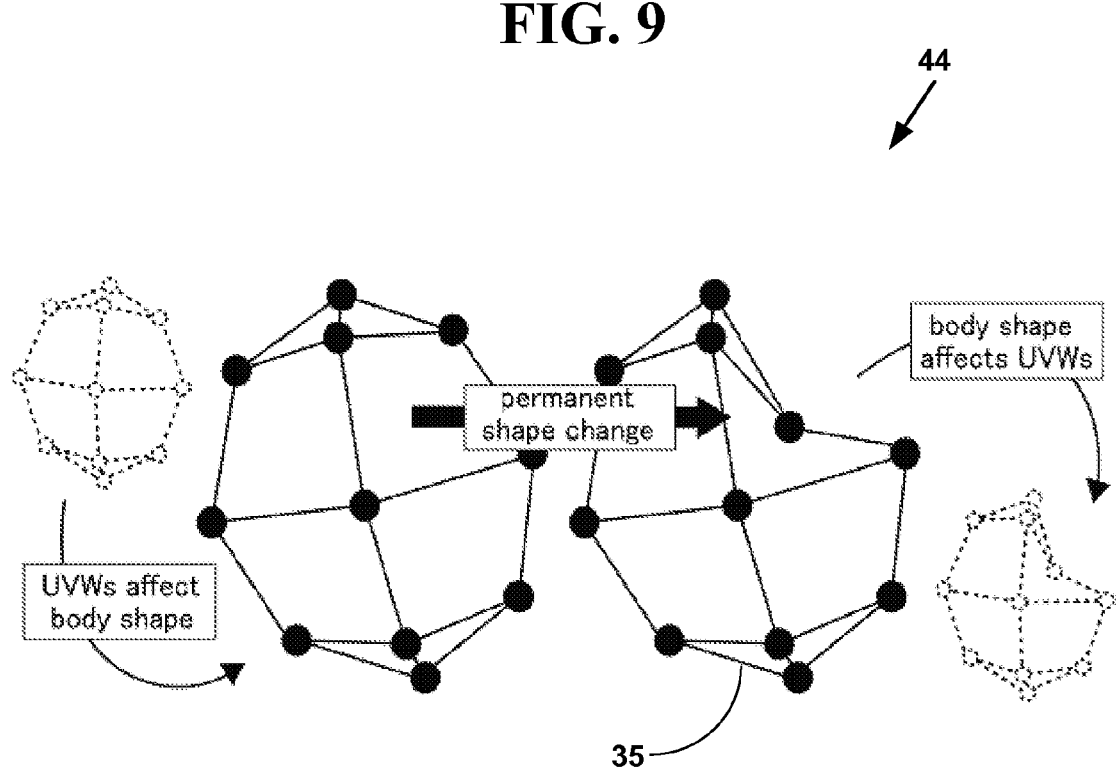
FIG. 9 is a block diagram illustrating a shape change in a body, motivated by an external force, such as a collision with another object.

FIG. 9 is a block diagram 44 illustrating a shape change in a body. A shape change such as plastic deformation, dent, or wrinkle is simulated by modifying the body's undeformed shape in UVW space, and its springs' rest lengths and orientations, in response to the change in shape of the body in world space due to external forces. From left to right, the diagram illustrates the body's components in UVW space, the body's components in world space, the body's deformation in world space due to external forces, and the resulting change in the body's components in UVW space.

Figure 10:
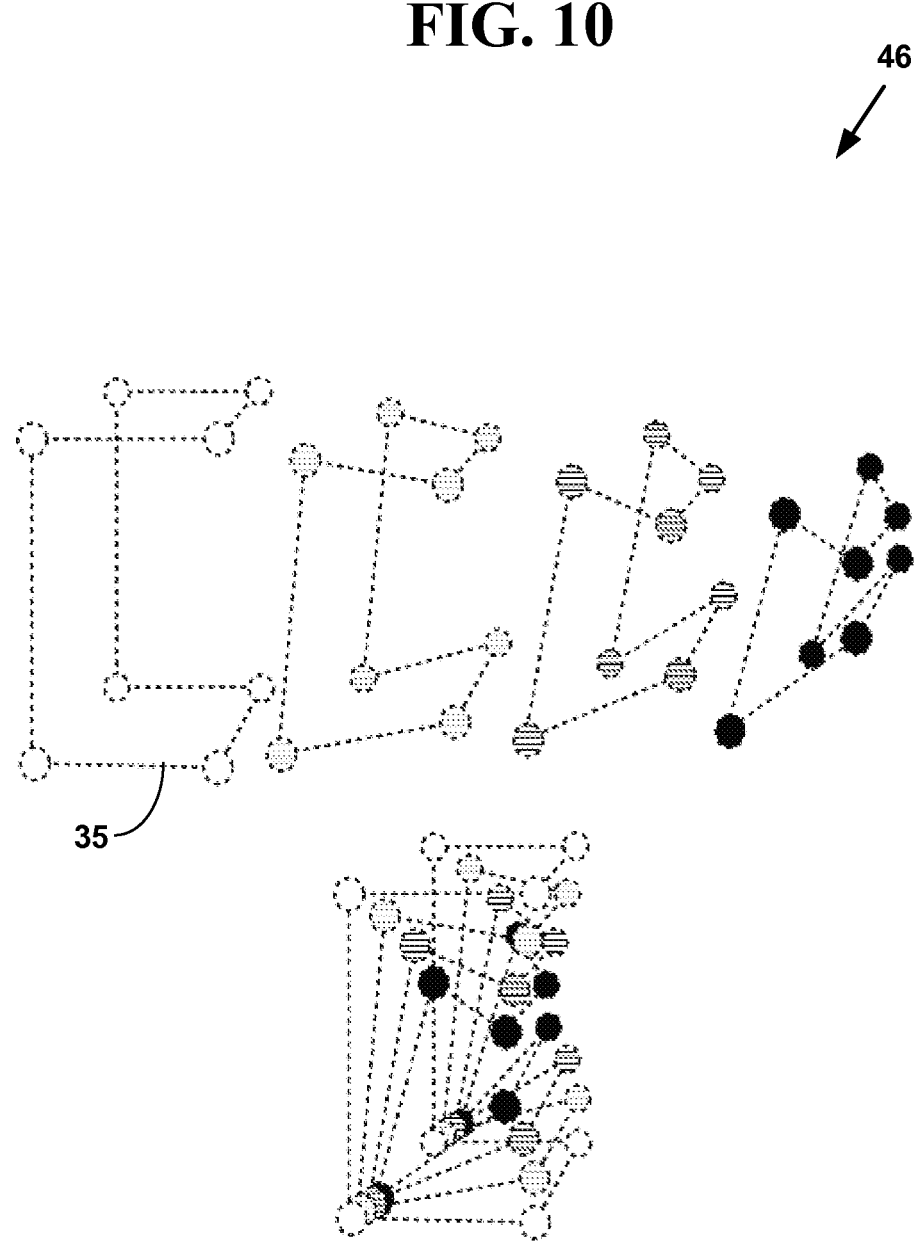
FIG. 10 is a block diagram illustrating a shape change in a body, motivated by an internal force, such as a contraction or extension.

FIG. 10 is a block diagram 46 illustrating another type of shape change in a body. A shape change such as a muscular contraction or extension is simulated by successively modifying the body's undeformed shape in its UVW space over time and consequently modifying its springs' rest lengths and orientations.

Returning to FIG. 2, at Step 30, the calculated one or more positions, and optionally any of velocities, accelerations, and orientations of the entity are used to display zero or more two-dimensional (2D) or three-dimensional (3D) simulated views of one or more representations of the entity or sub-portion thereof. 2D or 3D simulated views may include views of the combined rigid and flexible components of the entity.

Figure 11:
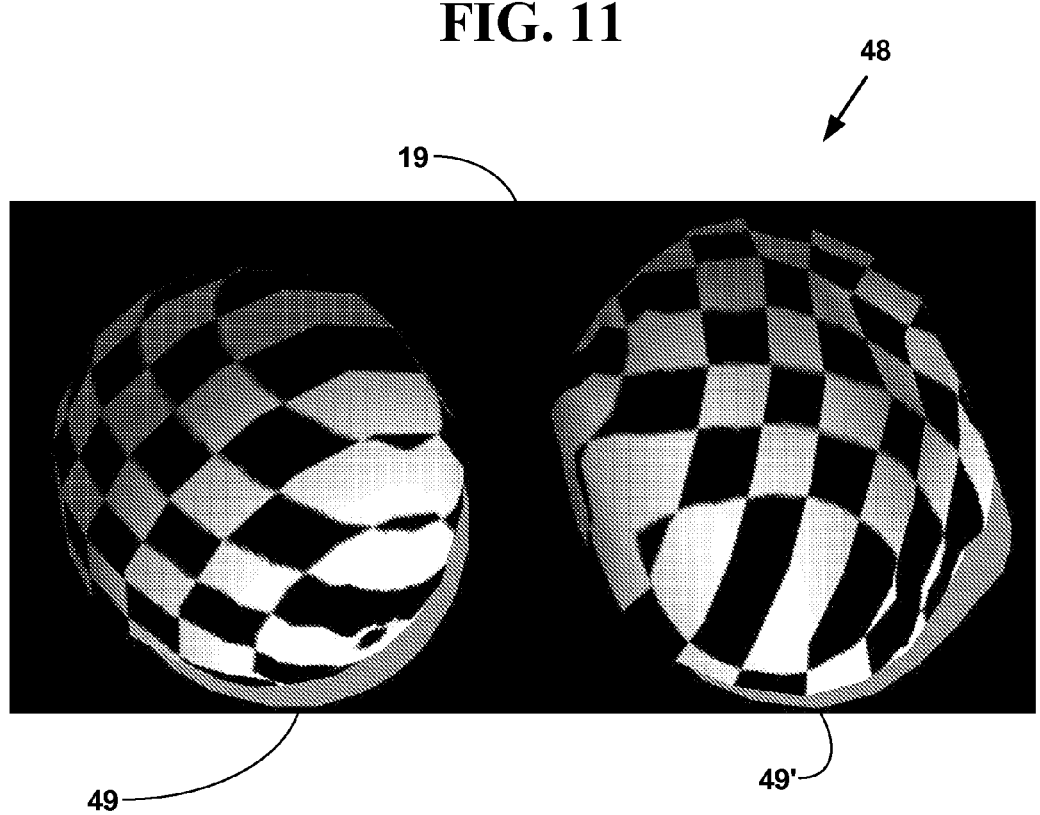
FIG. 11 is a block diagram illustrating a screen shot of a shape change in a body, motivated by an external force.

FIG. 11 is a block diagram illustrating an actual screen shot 48 of a shape change in a body from 49 to 49' motivated by an external generated force using the method and system described herein.

Figure 12:
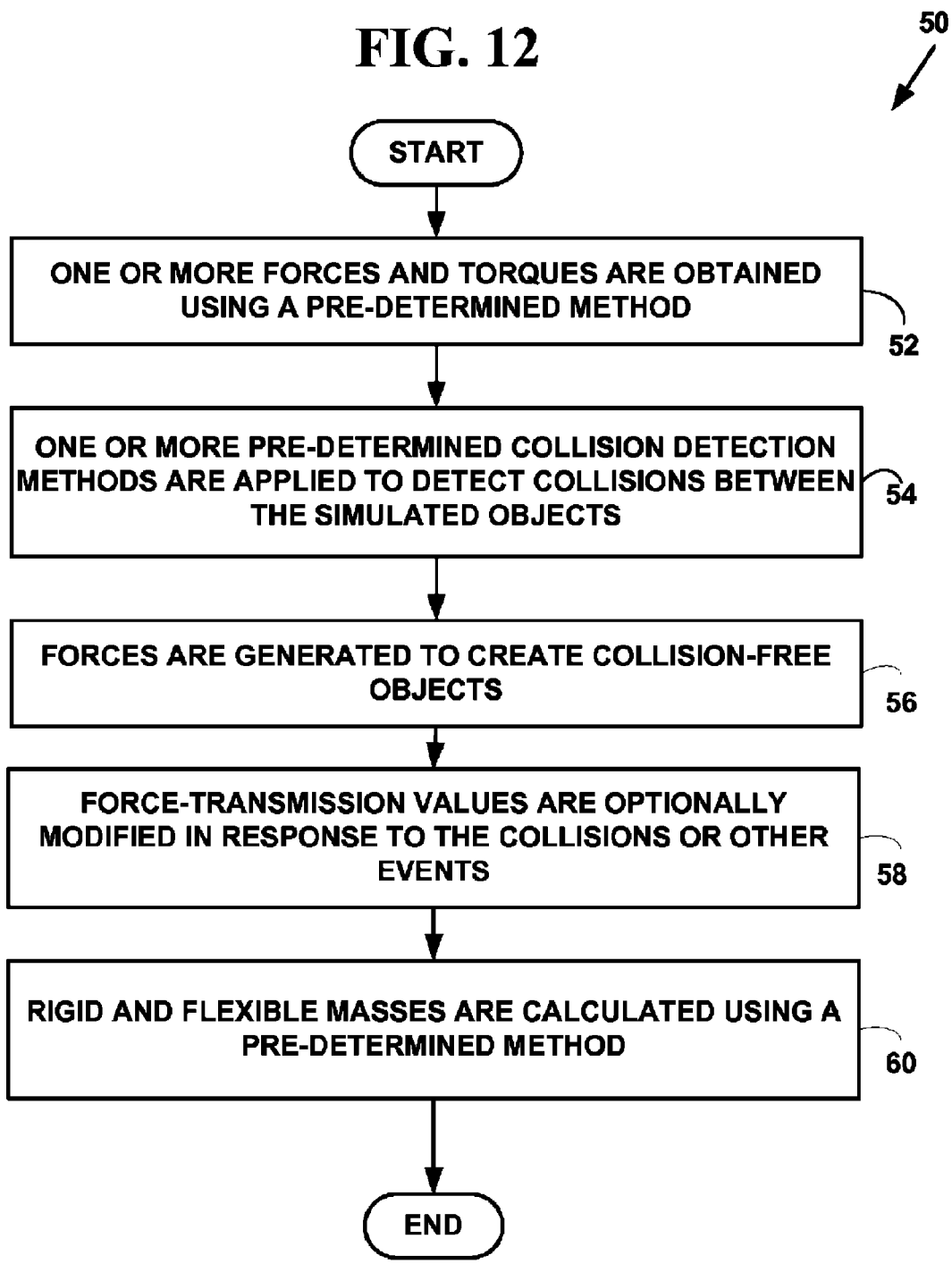
FIG. 12 is a flow diagram illustrating a method for simulating collisions between an entity or entities.

FIG. 12 is a flow diagram illustrating a Method 50 for simulating collisions between entities. At Step 52, one or more forces and torques are obtained using a pre-determined method. At Step 54, one or more pre-determined collision detection methods are applied to detect collisions between the simulated objects. At step 56, forces are generated to create collision-free objects. At Step 58, force-transmission values are optionally modified in response to the collisions or other events. At step 60, rigid and flexible masses are calculated.

A method of collision detection between arbitrary surfaces has been created. In one embodiment, the method uses parallel graphics hardware to perform point collision calculations, and reads the resulting data into host CPU memory. It enables the calculation of signed differences between two surfaces at a programmer-specified precision. This method provides speed and indifference to the type of geometry; complex and irregular surfaces are no more computationally expensive than simple cylinders and spheres. In another embodiment, the method of collision detection does not use parallel graphics hardware. This method provides indifference to the type of geometry being used.

Method 50 is illustrated with one exemplary embodiment. However, the present invention is not limited to such an embodiment and other embodiments can also be used to practice the invention.

In one embodiment, Method 50 is included in Method 32 of FIG. 3. However, the present invention is not limited to such an embodiment and other embodiments can also be used to practice the invention.

In this embodiment, Step 52 is equivalent to the corresponding step in Method 32.

At Step 54, one or more pre-determined collision detection methods are applied to detect collisions between the simulated objects.

At Step 56, forces are generated to create collision-free objects. In one embodiment, forces are created to push the colliding objects apart. However, the present invention is not limited to such an embodiment and other embodiments can also be used to practice the invention.

At Step 58, force-transmission values are optionally modified in response to the collisions or other events. This step has the effect of transmitting more or less force from the collision or other events to the rest of the components of the body, which is in turn expressed as rigid motion.

At step 60, rigid and flexible masses are calculated.

In one embodiment, the pre-determined method step 60 is equivalent to its corresponding step in Method 32 of FIG. 3. However, the present invention is not limited to such an embodiment and other embodiments can also be used to practice the invention.

The handling of forces and masses in the simulation methods described herein create a composite simulation method combining flexible and rigid-body simulation. It is possible, using a combination of rigid-body and flexible methods, to create: (a) flexible bodies that exhibit more accurate rotation; (b) composite structures of rigid, semi-rigid, and flexible components; and (c) specification of the rigidity of a structure (or substructure) with one or more simple interpolation or force-transmission parameters, where fully flexible entails a parameter value of 0.0, and fully rigid, 1.0.

Rigid-body simulation is concerned with inflexible materials, calculating the central position and rotation of a group of nodes. It is inexpensive to calculate from a numerical standpoint, and therefore desirable for real-time simulation. A "real-time" simulation guarantees response times within strict time constraints. Real-time simulations operate with response times that are in the order of milliseconds and sometimes microseconds or faster. Flexible-body simulation, using springs and nodes, is cheapest to calculate from a numerical standpoint when the springs are not too stiff. It is generally difficult to simulate even semi-rigid materials at interactive rates if there are great numbers of nodes. In the method disclosed herein, we split forces into rigid and flexible portions that are applied to any component with a non-zero force-transmission value in a body. Part of the force applied to such a component will be applied to the other components in the body. The force is split into rigid and flexible portions, and the resulting rigid motion is applied to the other components in ratios that conserve physical properties, such as the body's momentum, and its center-of-mass position in the absence of external forces. Also, the ratio into which the rigid motion is split can be different for each component in the body, so that the rigidities of each of the individual components in the body can vary. This method makes it easier to simulate stiff and semi-rigid materials than with traditional spring-and-dashpot methods.

Spring-dashpot simulation models are typically hard to integrate accurately. Several springs connected to a single component, when excited by forces (such as those in a collision), will give rise to either large counter-forces, which require small time-steps to resolve, or high-frequency vibrations, which also require small time-steps to resolve. Small time-steps are the enemy of real-time simulation. To create 3D structures, springs must be attached to nodes in a lattice, the most efficient of which is a tetrahedral lattice. In a best-case scenario, the number of springs attached to a component in such a lattice will be somewhere between three and twelve, each potentially pushing the component in a different, competing direction.

A more efficient method is obtained by using orientation-preserving springs to simulate flexible bodies. Multiple orientation-preserving springs attached to a component work in concert, rather than in competition. It has been determined experimentally that orientation-preserving spring formulation allows the simulation of a 3D structural lattice at about a cost of half, and sometimes as little as 8%, of its original computation. Another more important effect of the formulation is that orientation-preserving springs can be used to simulate muscle and other materials that expand, contract, or otherwise change shape; these materials are difficult to model because they contain both directed force and mechanical properties that are not addressed by standard spring equations, whereas orientation-preserving springs incorporate both.

Figure 13:
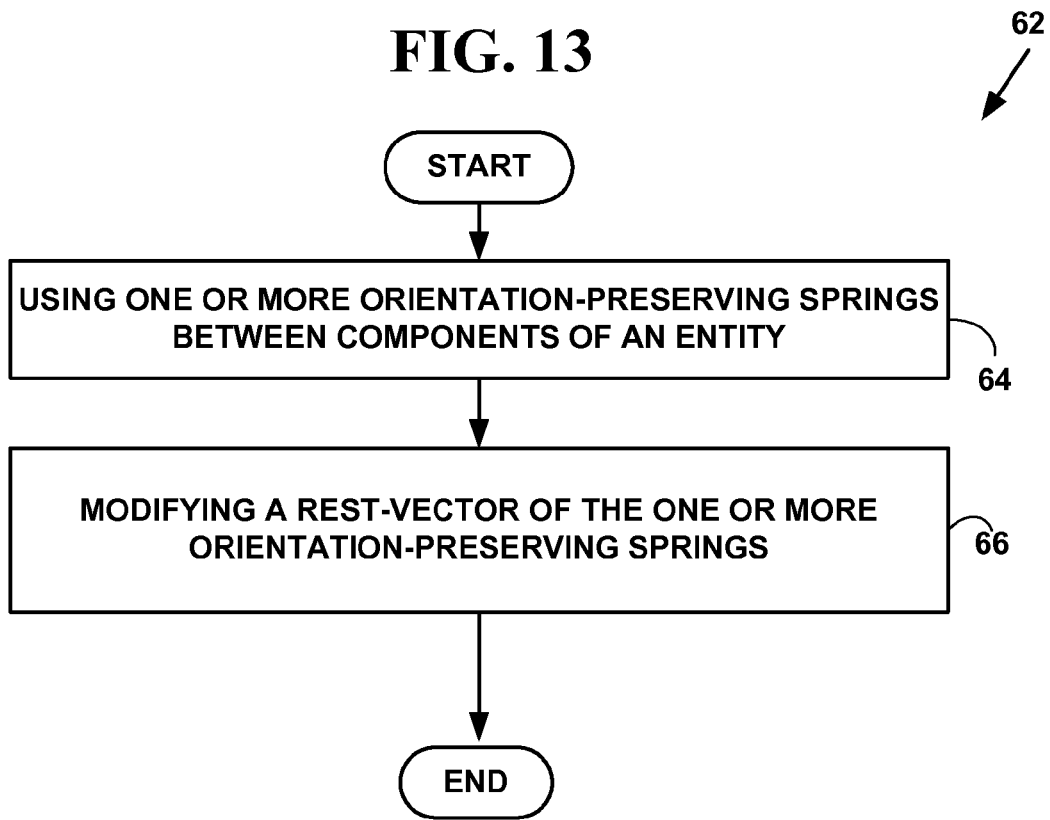
FIG. 13 is a flow diagram illustrating a method for use of orientation-preserving springs for creating a permanent or semi-permanent shape change in a material or body.

FIG. 13 is a flow diagram illustrating a Method 62 for use of orientation-preserving springs for creating a permanent or semi-permanent shape change in a material or body. At Step 64, one or more orientation-preserving springs are used between components of an entity. At Step 66, a rest-vector of the one or more orientation-preserving springs is modified. The one or more rest-vectors of the orientation-preserving springs are modified as a result of any of: a) one or more collisions, b) a plastic change in a material due to internal or external forces, c) a response to user input, or a combination thereof.

Figure 14:
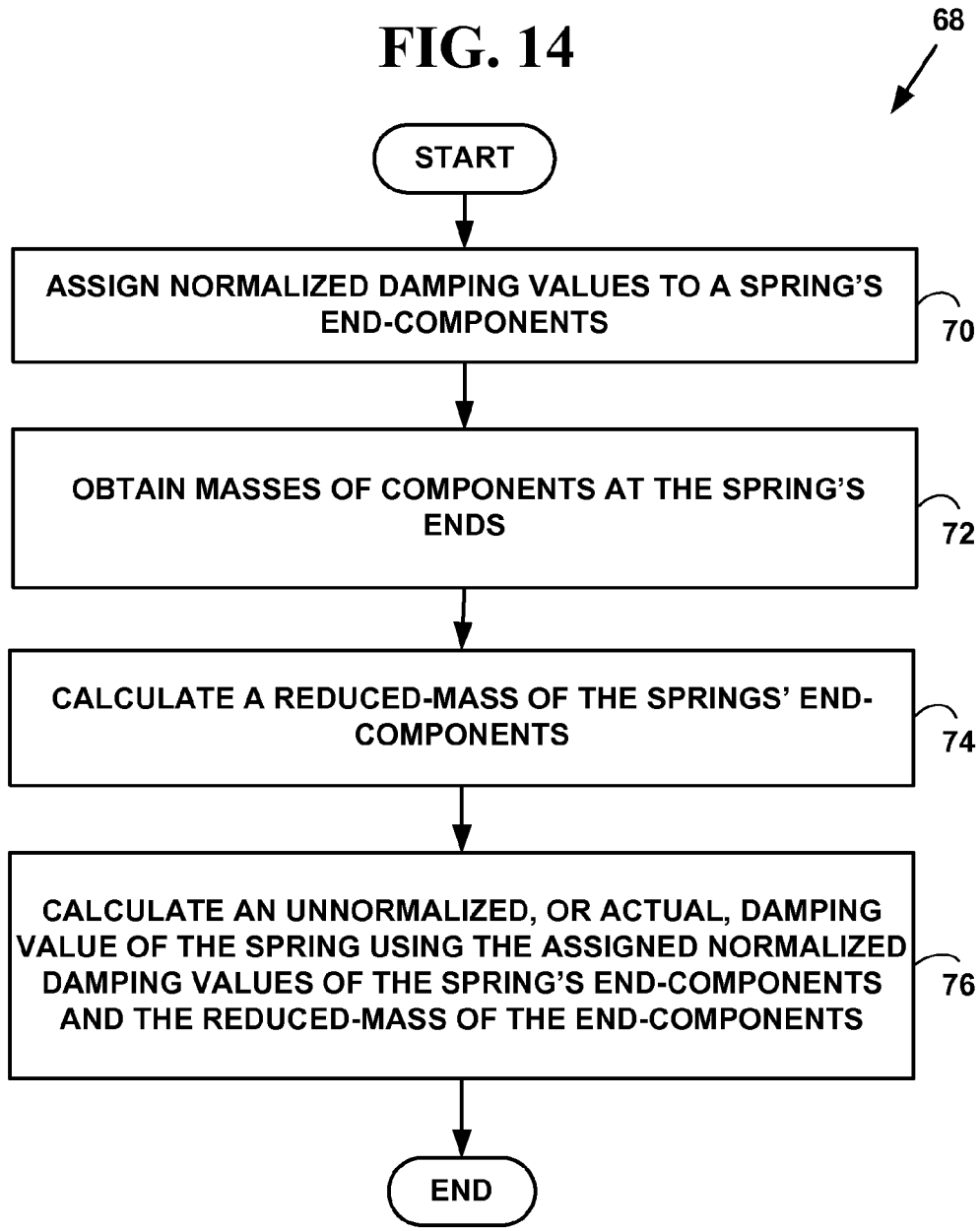
FIG. 14 is a flow diagram illustrating a method for normalizing a damping value of a spring.

FIG. 14 is a flow diagram illustrating a Method 68 for assigning a normalized damping value of a spring, the normalized value being defined by a value such that no damping maps to a zero value, underdamping maps to values less than one, critical-damping maps to the value one, and overdamping maps to values greater than one. As an initialization Step 70, normalized damping values are assigned to a spring's end-components. To compute the damping of a spring, at Step 72, the masses of the components at the spring's ends are obtained. At Step 74, the reduced-mass of the springs' end-components is calculated. At Step 76, one or more unnormalized (or actual) damping value of the spring are calculated using the assigned normalized damping values of the spring's end-components and the reduced mass of the end-components.

Methods 62 and 68 may be used independently or substituted for steps in other methods described herein that use orientation-preserving springs and damped springs respectively.

The method and system described herein can use orientation-preserving springs that are differentiated by type. Different formulations are used depending upon whether an orientation-preserving spring is internal or external to a body.

The method and system exhibits at least some of the following features. The method and system may have additional features, and is not limited to the features described here.

Interaction: allowing a user and the simulation to mutually act upon each other, at time intervals small enough to be perceived as continuous.

Direct manipulation: giving a user the perception that he or she is interacting with an actual object that is present in the same space as the user (as opposed to the perception that the object is on a display screen connected to a computer.)

Variable hardness: the ability for the simulation to specify, control, or change the force response of a body or sub-portion thereof, by allowing interpolation between a springlike force response and a rigid force response.

Improved stability: increasing the step-size used to stably simulate bodies, thereby speeding up the simulation. This is done by using improved equations and numerical methods, by reducing the number of springs necessary to construct a body, and by changing the way forces are used to simulate a body.

Decreased data requirements: allowing a body to be simulated using fewer elements than traditional methods.

More accurate rotation: methods for calculating body rotations that are improvements over those inherent in spring and dashpot simulations.

Adherence to conservation laws: obeying the laws of physics, thereby making it possible to apply standard forces to simulated materials without modifying their equations or translating them into another form.

Anisotropy: the ability of a body's masses to have different responses, in both their force-transmissions and the springs' various parameters, depending upon the direction a mass is pushed relative to the body.

Heterogeneity: the ability of one body to contain several different materials, including those that are of different hardness. Also, the ability of different bodies to represent materials of different hardness.

Volume and/or area preservation: where either the surface-area of a deformable body remains constant, or its volume remains constant. In the method and system, volume or area can be preserved or ignored. This allows the simulation of both incompressible and compressible materials.

Structural neutrality: where no ordering, connectivity, element size, shape, distance, or any specific layout need be imposed when creating a body. Bodies can be created from point, linear, surface, or volumetric data in any number of ways.

Lack of precomputation: where no precomputed data is required to simulate a body.

Nonlinearity: the ability to simulate materials that have nonlinear force responses.

Dynamic properties: the ability to simulate objects that are not in equilibrium. Examples include stretching, bending, expansion, extension, and contraction.

Example Dataflow and Workflow for Simulation System

TABLE 5

| COMPONENTS OF AN EXEMPLARY SIMULATION SYSTEM 10 |
| --- |
| 3D model data, representing the object(s) to be simulated |
| A computer on which to run the simulation |
| Mechanical material properties data, possibly gathered in advance, that contain any of mass, elastic, and other properties of the materials to be simulated |
| Instrumentation that associates material properties data with each of the 3D models |
| Physical simulation code that causes the 3D models to react appropriately to internal and external stimuli |
| A display engine similar to that used in the videogame and animation industries; used by the computer to draw the 3D models over and over again at a frame-rate of 20 times a second or more |
| Display devices such as screen(s) or monitor(s) on which to display the 3D models |
| Haptic devices that sense hand or other motion from a user and "push back", allowing the feel of material resistance and motion |
| Head-tracking hardware to let the computer know from where the user is looking, and tell the display engine to render the object(s) from that point of view |
| Stereoscopic glasses 17 or other 3D display hardware to give the illusion of depth |
| Positional audio to generate sound associated with the imagery |

What follows is how an exemplary system 10 works, routes and uses various data, and renders various modes of output to a user. However, the present invention is not limited to such an exemplary embodiment and other embodiments can also be used to practice the invention.

First, 3D model data is created by an artist in a modeling package on a computer, or alternately acquired onto the computer using a scanner, such as laser range scanner, computed tomography (CT) imager, magnetic resonance imaging (MRI) device, or another method. The result is a data file or files.

If scanned data is acquired, a preprocessing step is used to compute triangulated model data via a segmentation method or alternate method. The result is a data file or files.

A database of material properties is created. The data can be acquired using manual input, measurement instruments, MRI, CT, ultrasound, previously published data, or other methods.

The material properties and 3D model data are loaded into a computer simulation program.

Methods, manual or interactive specification from a user, pre-calculated data maps, or other methods are used to associate the material property data with the 3D model data. The 3D models are instrumented with any of rigid, semi-rigid, and flexible components for physical simulation, using the material properties as a guide. The result is either a data file or files, or an internal data structure or structures associating components of the 3D model data with material property data.

The simulation program then uses the instrumented 3D models to run a simulation 22 of the materials in the model, utilizing mathematical and physics equations to determine how the materials should move.

The computer simulation program continually gathers input from the user via haptic 13 and tracking devices 11 attached to the network device 12.

The computer simulation program continually displays a representation of the 3D model data to a user on a computer monitor or projection screen 14. The representation may be displayed stereographically 19, continuously generating a separate image for each of the user's eyes. The models are drawn on the display 14 at a frame-rate of 20 times per second or more. The user's head position is tracked 11, and the network device 12 draws the models from the user's point of view; in combination with 3D glasses 17, this gives the illusion that objects are "really there", as the user can look around and into them.

A representation of tool(s) (also a 3D model) is drawn along with the 3D model data. When the user moves a haptic or position-sensing device 13, the position of the device is sensed and used to reposition the tool model.

The computer simulation program continuously simulates the motion of and updates the 3D model data using the methods described herein. It uses the input from the user and the material property data, along with other forces specified in the simulation, such as gravity, to generate forces which move the model.

The computer simulation program also continuously outputs haptic force data to the haptic devices 13 attached to the network device 12, allowing the user to feel the 3D model and its movements. Collisions are calculated between the tool model and the 3D models in the simulation. As the forces in the simulation are computed, the ones affecting the tool are sent to the effectors in the haptic device 13 and the user feels the effectors' pushing and pulling as the resistance and motion of the models.

The computer simulation program may also output audio, including continuous and event-based, positional and environmental, and other forms. The audio may be used as cues, for providing information and guidance, as music, and for other reasons.

The program may also use the user's spoken audio as commands, requests, communication with other users, and for other reasons. Commands may also be typed via a keyboard, or issued in other ways.

Because the interactions are simulated, visuals may be augmented with informational displays, such as highlighting where contact occurs between an object and a tool, and other methods.

The method and system described herein allow the creation of a mathematical simulation of materials, and a representation of the contact forces that occur during real-world situations. The simulated material components may be generated from any of point, surface (e.g., modeling software, laser range scanner, stereo video capture device, 3D digitizer, or other device), volumetric (e.g., CT, MRI, or other device), and mechanical material properties data. A force-transmission value is computed for each component. The method and system allows virtual representations of models to be constructed and used in a simulation 10. The resulting contacts with the simulated objects may be seen and felt by a user, as if they were interacting with real objects, via computer-generated visuals 19 and haptic (touch) feedback 13.

An off-line simulation, during which interactive user input may not be a component of the simulation, and neither real-time nor any other display of the materials is required, can also be effected.

Cloud Computing Networks

In one embodiment, the communications network 18 includes a cloud communications network 18' comprising plural different networks xx, xx, xx, xx. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

FIG. 15 is a block diagram 78 illustrating an exemplary cloud communications network 18'. However, the present invention is not limited to this cloud computing model and other cloud computing models can also be used to practice the invention. The exemplary cloud communications network includes both wired and/or wireless components of public and private networks.

This exemplary cloud computing model for interactive simulation of materials and physically based models promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 6. However, the present invention is not limited to these essential characteristics and more, fewer or other characteristics can also be used to practice the invention.

TABLE 6

On-demand electronic document services. An interactive simulator of materials and physically based models can unilaterally provision computing capabilities, such as server time and network storage, as needed automatically without requiring human interaction with each network server on the cloud communications network 18'.
Broadband network access. Interactive simulation of materials and physically based models input and display capabilities are available over plural broadband communications networks and accessed through standard mechanisms that promote use by heterogeneous thin or thick client platforms (e.g., mobile phones, smart phones 14, tablet network devices 12, laptops 12', PDAs, etc.). The broadband network access includes high speed network access such as 3G and/or 4G wireless and/or wired and broadband and/or ultra-broad band (e.g., WiMAX, etc.) network access.
Resource pooling. Interactive simulation of materials and physically based models input and display computing resources are pooled to serve multiple processors using a multi-tenant model, with different physical and virtual resources dynamically assigned and reassigned according to demand. There is a sense of location independence in that the processors generally have no control or knowledge over the exact location of the provided by simulation resources but may be able to specify location at a higher level of abstraction (e.g., country, state, or datacenter). Examples of pooled resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale in for interactive simulation of materials and physically based models input and display. To a simulator, the interactive simulation of materials and physically based models input and display capabilities available for provisioning appear to be unlimited and can be used in any quantity at any time.
Measured Services. Cloud computing systems automatically control and optimize resource use by leveraging a metering capability at some level of abstraction appropriate to the type of interactive simulation of materials and physically based models input and display service (e.g., storage, processing, bandwidth, custom electronic information displays, etc.). Interactive simulation of materials and physically based models input and display usage is monitored, controlled, and reported providing transparency for both the display provider and for a user of the service.

Exemplary cloud computing service models illustrated in FIG. 15 appear in Table 7. However, the present invention is not limited to these service models and more, fewer or other service models can also be used to practice the invention.

TABLE 7

Cloud Computing Software Applications 80 for an Interactive simulation of materials and physically based models input and display Service (CCSA 82). The capability to use the composite simulation method and system running on a cloud infrastructure 84. The cloud computing applications 86, are accessible from a server network device from various client devices through a thin client interface such as a web

TABLE 7-continued browser, etc. The user does not manage or control the underlying cloud infrastructure 84 including network, servers, operating systems, storage, or even individual application capabilities, with the possible exception of limited user-specific application configuration settings.
Cloud Computing Infrastructure 84 for the an Interactive simulation of materials and physically based models input and display Service (CCI 86). The capability provided to the user is to provision processing, storage, networks 18, 92, 94, 96, 98 and other fundamental computing resources where the consumer is able to deploy and run arbitrary software, which can include operating systems and applications. The user does not manage or control the underlying cloud infrastructure 84 but has control over operating systems, storage, deployed applications, and possibly limited control of select networking components (e.g., host firewalls, etc.).
Cloud Computing Platform 88 for the an Interactive simulation of materials and physically based models input and display Service (CCP 90). The capability provided to the user to deploy onto the cloud infrastructure 84 created or acquired applications created using programming languages and tools supported servers. The user not manage or control the underlying cloud infrastructure 84 including network, servers, operating systems, or storage, but has control over the deployed applications and possibly application hosting environment configurations.

Exemplary cloud computing deployment models appear in Table 8. However, the present invention is not limited to these deployment models and more, fewer or other deployment models can also be used to practice the invention.

TABLE 8

Private cloud network 94. The cloud network infrastructure is operated solely for a electronic information display organization. It may be managed by the electronic information display organization or a third party and may exist on premise or off premise.
Community cloud network 96. The cloud network infrastructure is shared by several different organizations and supports a specific electronic document community that has shared concerns (e.g., mission, security requirements, policy, compliance considerations, etc.). It may be managed by the different organizations or a third party and may exist on premise or off premise.
Public cloud network 98. The cloud network infrastructure such as the Internet, PSTN, CATV, etc. is made available to the general public or a large industry group and is owned by one or more organizations selling cloud services.
Hybrid cloud network 92. The cloud network infrastructure 84 is a composition of two and/or more cloud networks 18' (e.g., private 94, community 96, and/or public 98, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software for interactive simulation of materials and physically based models input and display takes full advantage of the cloud paradigm by being service oriented with a focus on statelessness, low coupling, modularity, and semantic interoperability for electronic document processing.

In one embodiment, the network device 12 includes an application 23 that includes a cloud application 23' for a cloud network 18'. In such an embodiment, the application 23 on the network device 12 and one or more server network devices 21 each with one or more processors and one or more associated databases 21' (only one of which is illustrated in FIG. 1A) provide a cloud computing Infrastructure as a Service (IaaS) 86, a cloud computing Platform, as a Service (PaaS) 90 and offers specific cloud simulation services as a Service (SaaS) 82 including a cloud software service, wherein the IaaS 86, PaaS 90 and SaaS 82 include one or more of the interactive simulation of materials and physically based models input and display services comprising networking, storage, server network device, virtualization, operating system, middleware, run-time, data or application services, or plural combinations thereof, on the cloud communications network 18'.

Such services provide a cloud-based connection between system 10 and other virtual reality and/or haptic systems to effect interaction between users in different locations or the same system and/or or on different systems in the same location However, the present invention can be practice with or without a cloud application and/or a cloud communications network and the present invention is not limited to cloud communications networks.

Simulating Materials and Virtual Models

Figure 16D:
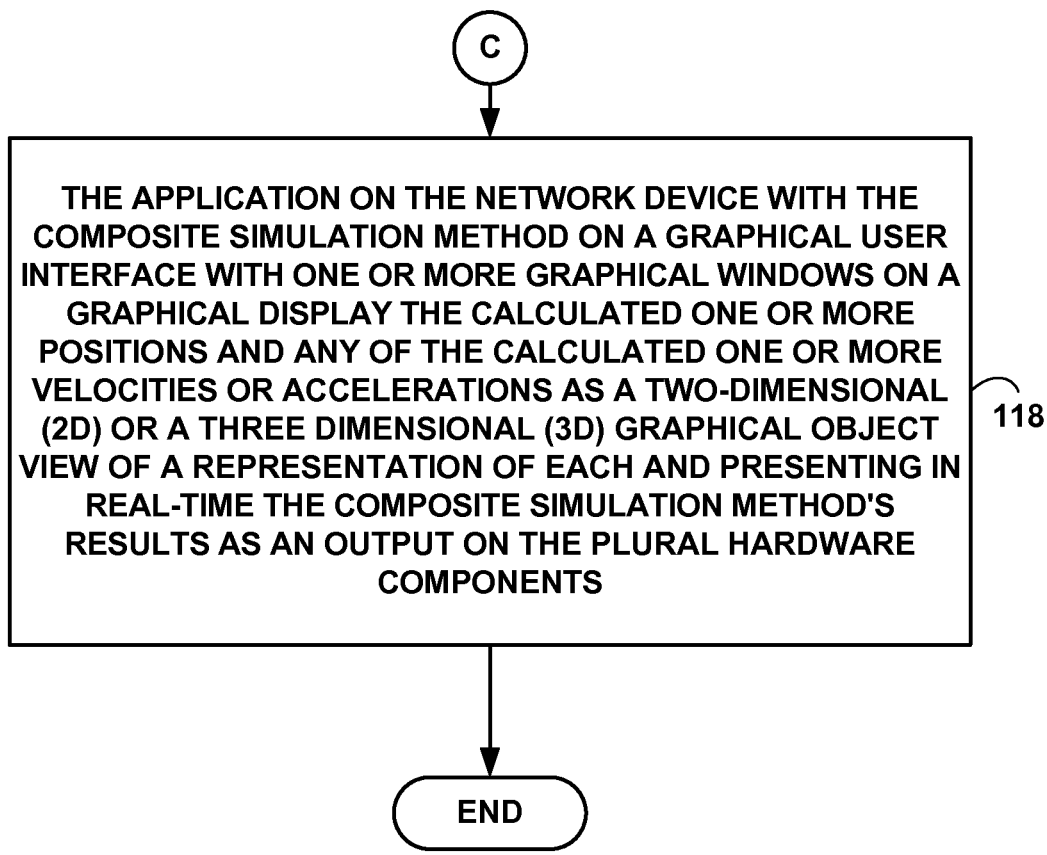

FIGS. 16A-16D are a flow diagram illustrating a Method 100 simulating rigid, semi-rigid, and flexible components of materials and models. In FIG. 16A at Step 102, a network device with a display and with one or more processors connects plural hardware components including a plural haptic devices, head trackers, stereoscopic displays and audio speakers to each other and to the application on the network device. At Step 104, an application on the network device defines one or more individual components for each of one or more entities being simulated. A three-dimensional (3D) entity includes at least four individual components combined into the 3D entity being simulated. Each of the one or more individual components includes plural individual component portions. At Step 106, the application on the network device defines for each of the one or more individual components, a force transmission parameter obtained from plural force transmission parameter values, such that a selected entity's rigid mass is greater than zero and less than its total mass, the plural force transmission parameter values including a first force transmission parameter value representing a fully flexible component, a second force transmission parameter value representing a fully rigid component and plural other force transmission parameter values with values in-between the first force transmission parameter value and the second force transmission parameter value representing varying levels of semi-rigidity. The selected entity's rigid mass is calculated according to a force transmission equation:

$$m_r = \sum_1^n m_i trans_i,$$

(Table 3),
wherein $m_r$ is a rigid mass, $m_i$ represents a mass of one of the selected entity's individual components and $trans_i$ is an individual component's corresponding force transmission parameter value. In FIG. 16B at Step 108, the application on the network device combines a method for simulating flexible entities with a method for simulating rigid entities into a composite simulation method, the composite method including each entity being simulated comprising one or more individual components and each individual component being individually defined with a separate force transmission parameter value, allowing each of the plurality of individual component portions of the one or more individual components of the entity being simulated to include any combination of rigid, semi-rigid and flexible components, simulating either similar materials or composites of different materials or models. The method for simulating flexible entities that has been combined uses a model comprising individual point-masses connected by idealized springs or dashpots. The one or more individual components are represented by the point-masses. In the composite simulation method, an acceleration due to rigid motion is calculated according to a rigid acceleration motion equation, $$\ddot{x}_i^r = \frac{f_i}{m_r} trans_i,$$

(Table 3).
In the composite simulation method, an acceleration due to deformation is calculated according to a deformation acceleration motion equation:

$$\ddot{x}_i^f = \frac{f_i}{m_i}(1 - trans_i),$$

(Table 3). The equation value $f_i$ is a force applied to an individual component, $\ddot{x}_i^r$ is an acceleration due to rigid motion and $\ddot{x}_i^f$ is an acceleration due to deformation. At Step 110, the application on the network device obtains with the composite simulation method a plural positions, velocities and accelerations and a defined force transmission parameter value for each of the one or more individual components of each of the one or more entities being simulated. In FIG. 16C at Step 112, the application on the network device calculates with the composite simulation method plural forces and torques being applied on the one or more individual components of each of the one or more entities being simulated using the obtained positions, velocities or accelerations. At Step 114, the application on the network device calculates with the composite simulation method one or more of new positions, velocities and accelerations of the one or more individual components of each of the one or more entities of the entity being simulated using the calculated plural forces and torques and the one or more defined force transmission parameters. At Step 116, the application on the network device receives one or more selection inputs with the composite simulation method from one or more haptic devices connected to the network device for virtually moving, pushing, cutting, tearing, creating holes therein, joining, melting or fusing one or more of the plurality of individual component portions of the one or more individual components of the one or more entities entity being simulated. In FIG. 16D at Step 118, the application on the network device displays in real-time with the composite simulation method on a graphical user interface with one or more graphical windows on a graphical display the calculated one or more positions and any of the calculated one or more velocities or accelerations as a two-dimensional (2D) or a three dimensional (3D) graphical object view of a representation of each and presenting in real-time the composite simulation method's results as an output on the one or more haptic devices and one or more non-haptic devices on the network device.

Method 100 is illustrated with one exemplary embodiment. However, the present invention is not limited to such an embodiment and other embodiments can also be used to practice the invention.

In one embodiment at FIG. 16A at Step 102, an application 23 on a network device 12 with a display 14 and with one or more processors connects plural hardware components including plural haptic devices 13, head trackers 11, stereoscopic displays 17 and/or audio speakers 25 to each other and to the application 23 and display 14 on the network device 12.

The visual and haptic workspaces must be connected to provide accurate data rendering. A high-fidelity synergistic display 14 yields a direct mapping between virtual and physical spaces. Position tracking devices 11 allows user-centered visual display and immersive interaction. Tracking inaccuracies are unacceptable, as they lead to incorrect stereoscopic projections and inconsistent manipulation and navigation. Individually calibrated workspaces need to be registered to accommodate their relative location, orientation and scale on the workspace (e.g., display 14, etc.). By registering devices on a workspace 14 a uniform boundary is used describe position, orientation, and temporal locations in physical space of a virtual entity (e.g., 19, etc.).

In one embodiment, the plural hardware components 11, 12, 13, 14, 17, 25 are all automatically registered and physically and rigidly connected and co-located with respect to each other using a rigid harness 15 at fixed and specific distances and orientations. Such an embodiment offers advantages over systems known in the prior art that require constant updating of current distances and orientations of haptic devices 13, head trackers 11, stereoscopic displays 17 when they are continuously moved by a user during a simulation session. Such prior art systems thus require additional processing power and are much slower than those described by the current invention.

In another embodiment, the plural hardware components 11, 12, 13, 14, 17, 25 are unregistered and not-rigidly-connected with the rigid harness 15. In such an embodiment, the plural hardware components are dynamically positionable and movable and tracked by the application 23 with six (6) or more degrees of freedom by one or more device-trackers 11. This allows automatic and dynamic co-location and registration and re-registration of specific distances, orientations and temporal locations of the plural hardware devices in real-time during a simulation session by the application 23 on the network device 12. Such an embodiment offers advantages over systems known in the prior art because the composite method described herein allows such tracking and registration and/or re-registration dynamically in real-time, easier, faster and requiring less processing power than other prior art systems known in the art not using the composite method describe herein.

In mechanical arts, the "degree of freedom (DOF)" of a mechanical system is the number of independent parameters that define its configuration and the number of parameters that determine the state of a physical system. DOFs are important to the analysis of systems of bodies. The position of a rigid/flexible body in space is defined by at least three (3) components of translation and at least three (3) components of rotation, which means that it has at least six (3) degrees of freedom.

At Step 104, an application 23 on the network device 12 defines one or more individual components for each of one or more entities 19 being simulated. A three-dimensional (3D) entity includes at least four individual components combined into the 3D entity 19 being simulated. Each of the one or more individual components 35 includes plural individual component portions, including one or more points 37 etc.

The application 23 allows defining the one or more individual components 35 and sub-components by drawing, editing, animating, and interacting with one or more non-physically-based polygonal models, volumetric models, spline models, non-uniform rational basis spline (NURBS) models, or subdivision surface models in a physically-based, realistic manner, and/or with haptic feedback, with a user or users and/or with another computer system. The application 23 allows physical spines, hulls, and/or volume lattices into which a set of dynamically-moving 2D or 3D reference frames are attached, the reference frames allowing embedding of the non-physically-based polygonal models, volumetric models, or subdivision surface models, such that each location, point, or voxel in one of those non-physically-based models corresponds to a location on a physically-based spine, hull, and/or volume lattice, thread, hair, atomic particle (electron, neutron, quark, boson, etc.), molecule (inorganic and organic, etc.), fluid, viscous material, mechanical motions, such as rotations and translations of objects, as created by electrical motors, hydraulic pumps, mechanical linkages, wheels, gears or robotic models. However, the present invention is not limited to this embodiment and more, fewer or other types of 2D, 3D and higher order models can be used to practice the invention.

"Non-uniform rational basis spline (NURBS)" is a mathematical model commonly used in computer graphics for generating and representing curves and surfaces. It offers great flexibility and precision for handling both analytic (e.g., surfaces defined by common mathematical formula) and modeled shapes.

In one embodiment, a set of dynamically-moving three-dimensional (3D) reference frames is created by the application 23. The 3D reference frames allow embedding of non-physically-based polygonal models, volumetric models or subdivision surface models, such that each location, point, or voxel in a 3D reference frame corresponds to a location on a physically-based spine, hull or volume lattice.

A "voxel" (volumetric pixel or Volumetric Picture Element) is a volume element, representing a value on a regular grid in 3D space. This is analogous to a pixel, which represents 2D image data in a bitmap (which is sometimes referred to as a pixmap).

In one embodiment, if a fluid model is used, Lennard-Jones forces are used instead of the spring forces between the points of a body as described herein. The Lennard-Jones potential (also referred to as the L-J potential, 6-12 potential, or 12-6 potential) or Lennar-Jones forces are a mathematical model that approximates an interaction between a pair of neutral atoms or molecules. However, the present invention is not limited to this embodiment, and more, fewer or other types of force descriptions can be used to practice the invention.

In another embodiment, the application 23 defines one or more individual components 35 of a virtual robot and provides virtual robotic control. In such an embodiment, the application 23 gives haptic feedback to a user and interaction with the virtual robot's environment. The robot need not have force-reflection built into the virtual robot's mechanism. The virtual robot is built to include sensors that relay the robot's position (e.g., joint angles, etc.) and optionally information about the robot's environment, including locations of objects in the environment, to application 23. The application 23 incorporates the robot's position and optionally information about its environment, using the composite method described herein to provide force-feedback to the user.

At Step 106, the application 23 on the network device 12 defines for each of the one or more individual components 35, a force transmission parameter 39 obtained from plural force transmission parameter values 39, 39' 39", etc. such that a selected entity's 19 rigid mass is greater than zero and less than its total mass, the plural force transmission parameter values 39 including a first force transmission parameter value representing a fully flexible component, a second force transmission parameter value representing a fully rigid component and plural other force transmission parameter values with values in-between the first force transmission parameter value and the second force transmission parameter value representing varying levels of semi-rigidity. The selected entity's rigid mass is calculated according to a force transmission equation:

$$m_r = \sum_1^n m_i trans_i,$$

(Table 3)
wherein $m_r$ is a rigid mass, $m_i$ represents a mass of one of the selected entity's individual components and $trans_i$ is an individual component's corresponding force transmission parameter value as was described in detail herein. (See FIGS. 2-15). However, the present invention is not limited to this embodiment or force transmission equation and other embodiment and other force transmission equations can be used to practice the invention.

In FIG. 16B at Step 108, the application 23 on the network device 12 combines a method for simulating flexible entities with a method for simulating rigid entities into a composite simulation method, the composite method including each entity being simulated comprising one or more individual components 35 and each individual component 35 being individually defined with a separate force transmission parameter value 39, allowing each of the plurality of individual component portions of the one or more individual components 35 of the entity being simulated to include any combination of rigid, semi-rigid and flexible components, simulating either similar materials or composites of different materials or models. The composite method for simulating flexible entities that has been combined uses a model comprising individual point 37 masses connected by idealized springs or dashpots. The one or more individual components 35 are represented by the point-masses. In the composite simulation method, an acceleration due to rigid motion is calculated according to a rigid acceleration motion equation, $$\ddot{x}_i^r = \frac{f_i}{m_r} trans_i,$$

(Table 3).
In the composite simulation method, an acceleration due to deformation is calculated according to a deformation acceleration motion equation:

$$\ddot{x}_i^f = \frac{f_i}{m_i}(1 - trans_i),$$

(Table 3). The equation value $f_i$ is a force applied to an individual component, $\ddot{x}_i^r$ is an acceleration due to rigid motion and $\ddot{x}_i^f$ is an acceleration due to deformation. (See FIGS. 2-15). However, the present invention is not limited to this embodiment or force transmission equation and other embodiment and other force transmission equations can be used to practice the invention.

At Step 110, the application 23 on the network device 2 obtains with the composite simulation method a plural positions, velocities and accelerations and a defined force transmission parameter value 39 for each of the one or more individual components 35 of each of the one or more entities 19 being simulated. (See FIGS. 2-15).

In FIG. 16C at Step 112, the application 23 on the network device 12 calculates with the composite simulation method plural forces and torques being applied on the one or more individual components 37 of each of the one or more entities 35 being simulated using the obtained positions, velocities or accelerations. (See FIGS. 2-15).

At Step 114, the application 23 on the network device 12 calculates with the composite simulation method one or more of new positions, velocities and accelerations of the one or more individual components 35 of each of the one or more entities entity being simulated using the calculated plural forces and torques and the one or more defined force transmission parameters 39. (See FIGS. 2-15).

At Step 116, the application 23 on the network device 12 receives one or more selection inputs with the composite simulation method from one or more haptic devices 13 connected to the network device 12 for virtually moving, pushing, cutting, tearing, creating holes therein, joining, melting and/or fusing one or more of the plurality of individual component portions of the one or more individual components 35 of the one or more entities entity being simulated 19.

In FIG. 16D at Step 118, the application 23 on the network device 12 displays in real-time with the composite simulation method on a graphical user interface (GUI) with one or more graphical windows on a graphical display 14 the calculated one or more positions and any of the calculated one or more velocities or accelerations as a two-dimensional (2D) or a three dimensional (3D) graphical object view of a representation of each entity 19 being simulated and presenting in real-time the composite simulation method's results as an output on the one or more haptic devices 11, 13, 17, 19, and one or more non-haptic devices 14, 25 on the network device 12.

In one embodiment, the GUI 16 includes graphical 3D menus 41, sliders 43, or buttons 45 that graphically "pop up" in and/or around a user interface for the plural hardware components 11, 13, 17, 19. However, the present invention is not limited to this embodiment and other embodiments can be used to practice the invention.

In one embodiment, the composite method described herein is combined the with a particle system simulation method creating a new composite method to simulate materials or combinations of fluids and materials.

Simulation of fluids and their motion in computer graphics has been attempted with a variety of methods. Exemplary particle simulation methods for fluids, include, but are not limited to, those described by Preomoze in his paper "*Particle Based Simulation of Fluids*," published in Eurographics 2003, Vol. 22, No. 3, 2003, teaches "Kass and Miller used height field to represent the fluid surface and used shallow water partial differential equations to describe the fluid motion. O'Brien and Hodgins also used a height field representation coupled with a particle system to represent fluid motion with splashing that was missing in previous methods. Foster and Metaxas realized the limitation of the height field representation and used a Marker-And-Cell (MAC) method to solve the Navier-Stokes equations. Massless marker particles are put into the computational grid and advected according to the velocity field to track the surface. Their method was a true 3D method and was therefore able to simulate fluid pouring and splashing. Stam simulated fluids using a semi-Lagrangian convection that allowed much larger time-steps while being unconditionally stable. Foster and Fedkia greatly improved the MAC method by using the level set approach for tracking the fluid interface. Enright further improved this method by introducing an improved method of tracking the water interface using particle level set and a new velocity extrapolation method. Enright et al describe this thickened front tracking method in more detail. Carlson et al. also utilized the MAC algorithm for animation of melting and solidifying object. Alternative methods of simulation fluid motion were described by using particle-based simulations. Miller and Pearce simulate deformable objects with particle interactions based on the Lennard-Jones potential force. This force is strongly repellent when particles are close together and weakly attractive when particles are some distance apart. Terzopoulos et al. pairs particles together to better simulate deformable objects. Tonnesen improves particle motion by adding additional particle interactions based on heat transfer among particles. Lucy introduced a flexible gridless particle method called smoothed particle hydrodynamics (SPH) to simulate astrophysical problems including galaxial collisions and the dynamics of star formation. The fluid is modeled as a collection of particles, which move under the influence of hydrodynamic and gravitational force. SPH has recently been adapted to many relevant engineering problems, including heat and mass transfer, molecular dynamics, and fluid and solid mechanics. SPH is a flexible Lagrangian method that can easily capture large interface deformation, breaking and merging, and splashing. Desbrun and Cani-Gascuel described a model of deformable surfaces and metamorphosis with active implicit surfaces. SPH method was used to compute particles motion and particles were coated with a potential field. Desbrun and Cani improved the particle model to simulate a variety of substances using a state equation to compute the dynamics of the substance. Adaptive sampling of particles improved the computational efficiency of the method by subdividing particles where substance undergoes large deformation, and merging particles in less active areas. Stora et al. also used smoothed particles to solve the governing state equation for animated lava flows by coupling viscosity and temperature field. While the SPH method is flexible, it can only solve compressible fluid flow. Several extensions have been proposed to allow simulation of incompressible fluids with SPH. Recently, another gridless particle method called the Moving-Particle Semi-Implicit (MPS) was developed that solves governing Navier-Stokes equations for incompressible fluids. The MPS method is capable of simulating a wide variety of fluid flow problems including phase transitions, multiples as flow, sediment-laden flows and elastic structures. The computational algorithm in this paper is based on the MPS method. The Moving Particle Semi-implicit method is a Lagrangian method of computing fluid motion. Contrary to the grid-based Eulerian methods where physical quantities are computed on fixed points in space, the computational elements in the MPS method are discrete number of particles of fluid followed in time. The MPS method is meshless. Given an arbitrary distribution of interpolation points, all problem variables are obtained from values at these points through an interpolation function (kernel). Interpolation points and fluid particles coincide."

However, the present invention is not limited to these exemplary methods, more, fewer or other particle system simulation method for fluids can be used to practice the invention.

In addition, any particle system simulation method described herein can also be combined with a new flexible body method, a new rigid body method comprising other than those described for the composite method and the new combination is used to practice the invention for particle system simulation.

FIG. 17 is a flow diagram illustrating a Method 120 simulating rigid, semi-rigid, and flexible components of materials and models. In FIG. 17 at Step 122, a material or model to be simulated is split into plural sub-components by the application on the network device. At Step 124, the application on the network device determines plural points of contact between the sub-components and a plural other sub-components for another material or another model being simulated. At Step 126, the application on the network device adds data for the composite method only to selected sub-components of the material or model being simulated where interactions or motion of the material or model being simulated is required, thereby increasing a speed of computation of the composite method.

Method 120 is illustrated with one exemplary embodiment. However, the present invention is not limited to such an embodiment and other embodiments can also be used to practice the invention.

In one embodiment at FIG. 17 at Step 122, a material or model to be simulated is split into plural sub-components by the application 23 on the network device 12.

At Step 124, the application 23 on the network device 12 determines plural points of contact between the sub-components and a plural other sub-components for another material or another model being simulated.

At Step 126, the application 233 on the network device 12 adds data for the composite method only to selected sub-components of the material or model being simulated where interactions or motion of the material or model being simulated is required, thereby increasing a speed of computation of the composite method.

In one embodiment, Step 126 includes adding additional graphical material over the entity being simulated. For example, an original model may a structural model for a human torso. The additional graphical material may include a graphical skin for which a virtual surgery can be preformed with feedback from the haptic devices 13. However, the present invention is not limited to such an embodiment and the invention can be practice with adding additional graphical material.

FIG. 18 is a flow diagram illustrating a Method 128 simulating rigid, semi-rigid, and flexible components of materials and models. In FIG. 18 at Step 130, the application on the network device creates a simulation hierarchy with a N-number of levels, where plural masses make up a body in a first level, plural bodies are each treated as another plural masses in a larger body in a second level, plural larger bodies are treated as masses in a yet-larger body in a third level in a pattern repeating for the N-number of levels. At Step 132, application on the network device adds the simulation hierarchy to the composite method to create a hierarchical composite method for simulating materials or methods.

Method 128 is illustrated with one exemplary embodiment. However, the present invention is not limited to such an embodiment and other embodiments can also be used to practice the invention.

In one embodiment at FIG. 18 at Step 130, the application 23 on the network device 12 creates a simulation hierarchy with a N-number of levels, where plural masses make up a body in a first level, plural bodies are each treated as another plural masses in a larger body in a second level, plural larger bodies are treated as masses in a yet-larger body in a third level in a pattern repeating for the N-number of levels.

At Step 132, application 23 on the network device 12 adds the simulation hierarchy to the composite method to create a hierarchical composite method for simulating materials or methods.

The hierarchical composite method includes a method to simulate a particle system including both particles and fluids or other viscous materials. For example, such a hierarchical composite method is used to simulate cells, tissues, systems, in a human body, an animal or other organism, a large mechanical device such as a car, truck, boat, airplane, etc.

However, the present invention is not limited to this embodiment ant the invention can be practiced without the hierarchy.

Figure 19:
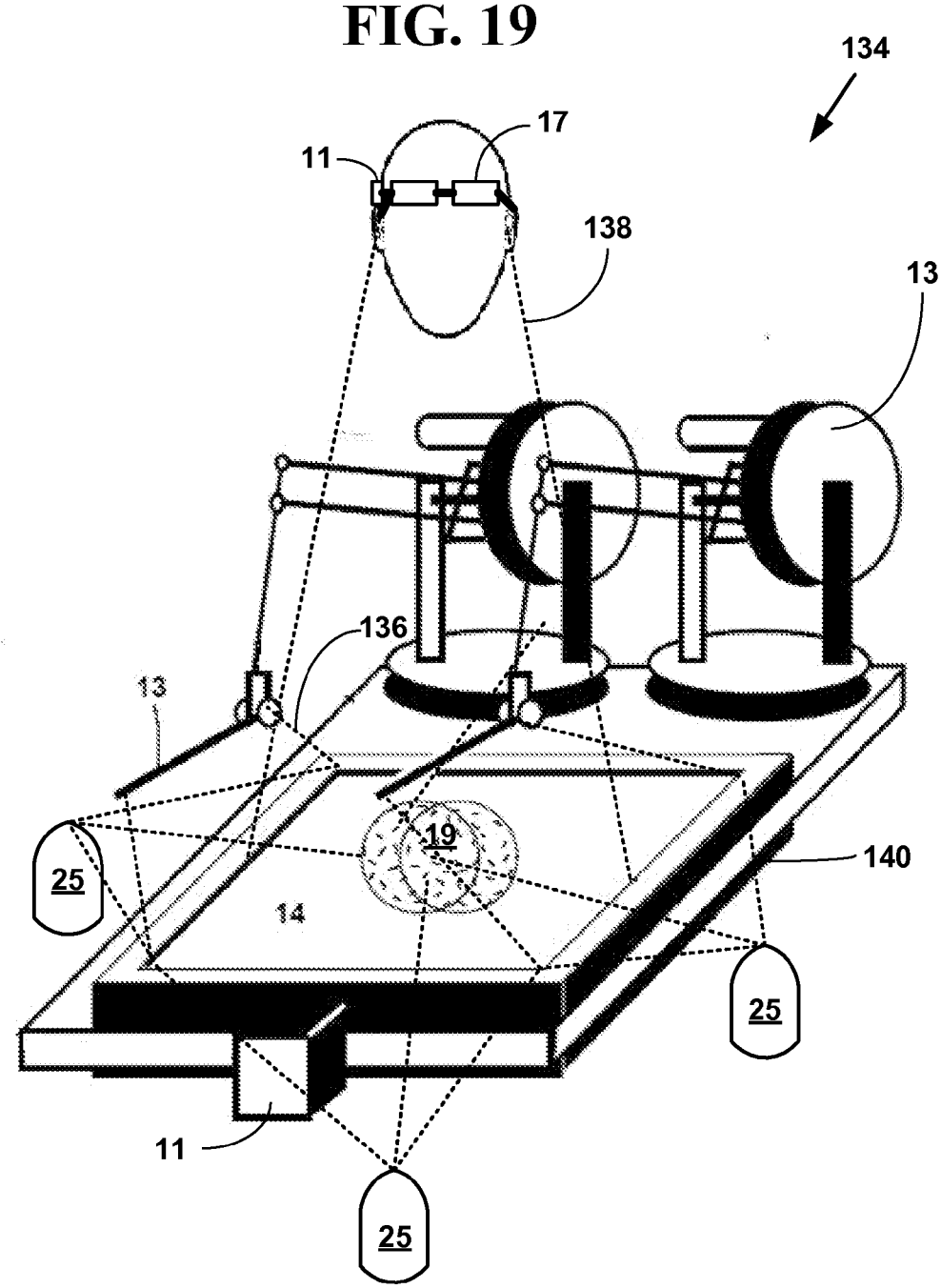
FIG. 19 is a block diagram of another configuration of exemplary simulation system of FIG. 1.

FIG. 19 is a block diagram 134 of another configuration of exemplary simulation system of FIG. 1.

In FIG. 19, system 10 includes a 3D stereoscopic display 14 oriented horizontally with a display area facing up. One or more haptic devices 13 are suspended above and behind the 3D stereoscopic display 14, so a first operating range 136 of the one or more haptic devices 13 substantially operates in a first surface area of the 3D stereoscopic display 14. One or more head-trackers 11 are positioned so a second operating range 138 includes an area in front of, to either side of, and/or above the 3D stereoscopic display, so that a 3D space a user's head would occupy during operation is covered on the 3D stereoscopic display 14. Three or more speakers 25 are placed around or above the 3D stereoscopic display 14, so that a third operational 140 area enclosed by the three or more speakers convex hull encloses the third operational area above and/or around the 3D stereoscopic display and the user, so audio sounds can be panned between the speakers so that they seem to be coming precisely from a specific location in 3D space with respect to the user. Operating ranges 136, 138 and 140 cover all of the surface area of the 3D stereoscopic display 14.

In one embodiment, the application 23 and/or cloud application 23' with the composite methods are implemented in completely hardware on the network device 12 including, but not limited to, field-programmable gate arrays (FPGA), global processing units (GPUs) and/or using parallel computing techniques on multiple CPUs.

A "field-programmable gate array (FPGA)" is an integrated circuit designed to be configured by a customer or a designer after manufacturing—hence "field-programmable". The FPGA configuration is generally specified using a hardware description language (HDL), similar to that used for an application-specific integrated circuit (ASIC). Contemporary FPGAs have large resources of logic gates and RAM blocks to implement complex digital computations.

A "global processing unit (GPU)" is one or processors used in a distributed computing environment and/or on cloud networks. One more applications can use the GPU.

"Parallel computing" is a form of computation in which many calculations are carried out simultaneously, operating on the principle that large problems can often be divided into smaller ones, which are then solved concurrently ("in parallel"). There are several different forms of parallel computing: bit-level, instruction level, data, and task parallelism.

However, the present invention is not limited to a hardware implementation and various combinations of general purpose, specialized or equivalent computer components including hardware, software, and firmware and combinations thereof, may be used with or perform operations in accordance with the teachings described herein.

The method and system described herein includes a method and system for drawing, displaying, editing animating, simulating and interacting with one or more virtual polygonal, spline, volumetric models, three-dimensional visual models or robotic models. The method and system provide flexible simulation, the ability to combine rigid and flexible simulation on plural portions of a model, rendering of haptic forces and force-feedback to a user.

It should be understood that the programs, processes, methods and system described herein are not related or limited to any particular type of computer, display, or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more fewer or equivalent elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for simulating rigid, semi-rigid, and flexible components of materials and models comprising:

connecting to a network device with one or more processors, a display and a plurality of hardware components including a plurality of haptic devices, head trackers, stereoscopic displays and audio speakers, connecting to each other and to the network device;

defining on an application on the network device one or more individual components for each of one or more entities being simulated, wherein a three-dimensional (3D) entity includes at least four individual components combined into the 3D entity being simulated and wherein each of the one or more individual components include a plurality of individual component portions;

defining on the application on the network device for each of the one or more individual components, a force transmission parameter obtained from a plurality of force transmission parameter values, a selected entity's rigid mass is greater than zero and less than its total mass, the plurality of force transmission parameter values including a first force transmission parameter value representing a fully flexible component, a second force transmission parameter value representing a fully rigid component and a plurality of other force transmission parameter values with values in-between the first force transmission parameter value and the second force transmission parameter value representing varying levels of semi-rigidity, wherein the selected entity's rigid mass is calculated according to the equation:

$$m_r = \sum_1^n m_i trans_i$$

wherein $m_r$ is a rigid mass, $m_i$ represents a mass of one of the selected entity's individual components and $trans_i$ is an individual component's corresponding force transmission parameter value;

combining on the application on the network device a method for simulating flexible entities with a method for simulating rigid entities into a composite simulation method, the composite simulation method including each entity being simulated comprising one or more individual components and each individual component being individually defined with a separate force transmission parameter value, allowing each of the plurality of individual component portions of the one or more individual components of the entity being simulated to include any combination of rigid, semi-rigid and flexible components, simulating either similar materials or composites of different materials or models, wherein the method for simulating flexible entities that has been combined uses a model comprising individual point-masses connected by idealized springs or dashpots, wherein the one or more individual components are represented by the point-masses, wherein in the composite simulation method, an acceleration due to rigid motion is calculated according to the equation:

$$\ddot{x}_i^r = \frac{f_i}{m_r} trans_i,$$

wherein in the composite simulation method, an acceleration due to deformation is calculated according to the equation:

$$\ddot{x}_i^f = \frac{f_i}{m_i}(1 - trans_i),$$

wherein $f_i$ is a force applied to an individual component $\ddot{x}_i^r$ is an acceleration due to rigid motion and $\ddot{x}_i^f$ is an acceleration due to deformation;

obtaining on the application on the network device with the composite simulation method a plurality of positions, velocities and accelerations and a defined force transmission parameter value for each of the one or more individual components of each of the one or more entities entity being simulated;

calculating on the application on the network device with the composite simulation method a plurality of forces and torques being applied on the one or more individual components of each of the one or more entities being simulated using the obtained positions, velocities or accelerations;

calculating on the application on the network device with the composite simulation method one or more of new positions, velocities and accelerations of the one or more individual components of each of the one or more entities entity being simulated using the calculated plurality of forces and torques and the one or more defined force transmission parameters;

receiving one or more selection inputs on the application on the network device with the composite simulation method from one or more haptic devices connected to the network device for virtually moving, pushing, cutting, tearing, creating holes therein, joining, melting or fusing one or more of the plurality of individual component portions of the one or more individual components of the one or more entities being simulated; and displaying in real-time on the application on the network device with the composite simulation method on a graphical user interface (GUI) with one or more graphical windows on the display the calculated one or more positions and any of the calculated one or more velocities or accelerations as a two-dimensional (2D) or a three dimensional (3D) graphical object view of a representation of each the one or more entities being simulated and presenting in real-time the composite simulation method's results as an output on the plurality of hardware components.

2. The method of claim 1 wherein the connecting step includes:

physically and rigidly connecting and co-locating the plurality of hardware components with respect to each other and to the network device and the display on the network device at fixed and specific distances and orientations using a rigid harness; and registering the plurality of hardware components with the application on the network device.

3. The method of claim 1 wherein the connection step includes:

connecting dynamically in real-time the plurality of hardware devices with the network device and the display on the network device with the application by dynamically tracking with one or more device trackers using six or more degrees of freedoms, specific distances, orientations and temporal locations of the plurality of hardware devices; and providing automatic and dynamic co-location and registration and re-registration of the plurality of hardware devices in real-time during a simulation session by the application on the network device.

4. The method of claim 1 wherein the defining step includes drawing, editing, animating, and interacting with one or more non-physically-based polygonal models, volumetric models, spline models, non-uniform rational basis spline (NURBS) models or subdivision surface models in a physically-based, realistic manner with haptic feedback via the application on the network device.

5. The method of claim 4 wherein the polygonal models, volumetric models, or subdivision surface models include physically-based spine, hull, volume lattice, wire, thread, hair, atomic particle, molecule, fluid, viscous material, mechanical motions, including rotations and translations of objects, as created by electrical motors, hydraulic pumps, mechanical linkages, wheels, gears or robotic models.

6. The method of claim 1 wherein the receiving step includes:

receiving one or more selection inputs on the application on the network device with the composite simulation method from one or more other types of input devices that act as tools or manipulators for interacting with other physically-based models, and provide force-feedback, wherein the physically-based models include dynamic real-time behavior, including cutting into other objects, grasping other objects, curling up, unfolding and rotating, wherein the one or more other types of input devices include surgical instruments including scalpels and retractors, power tools, mechanical grabbers and robotic arms.

7. The method of claim 1 wherein the application on the network device includes a cloud application communicating with a cloud communications network comprising one or more of each a public, private, community and hybrid networks, the cloud application providing the composite simulation method as a plurality of cloud services including a cloud computing Infrastructure as a Service (IaaS), a cloud computing Platform, as a Service (PaaS) and offers Specific cloud composite methods services as a Service (SaaS) including a cloud software service.

8. The method of claim 7 wherein the IaaS, PaaS and SaaS include one or more being simulated and further include one or more networking devices, storage network devices, or server network devices each with one or more processors, the one or more networking devices, storage devices or server network devices including virtualization applications, operating systems, middleware services, run-time services, data services, application services, or any combination thereof, on the cloud communications network.

9. The method of claim 1 wherein the application is implemented in hardware on the network device, or implemented by using field-programmable gate arrays (FPGA), by using global processing units (GPUs), or by using parallelization techniques on multiple central processing units (CPUs).

10. The method of Clam 1 further comprising:

creating a set of dynamically-moving three-dimensional (3D) reference frames, the 3D reference frames allowing embedding of non-physically-based polygonal models, volumetric models, spline models non-uniform rational basis spline (NURBS) models, or subdivision surface models, each location, point, or voxel in a 3D reference frame corresponds to a location on a physically-based spine, hull or volume lattice.

11. The method of claim 1 wherein the network device communicates with the plurality of hardware components with Near Field Communications (NFC) or Machine-to-Machine (M2M) Communications protocols.

12. The method of claim 1 wherein the network device communicates with other network devices over a non-cloud communications network or a cloud communications network with "Wireless Fidelity" (Wi-Fi) or "Worldwide Interoperability for Microwave Access" (WiMAX) communications.

13. The method of claim 1 wherein the GUI includes 3D menus, sliders, or graphical buttons that graphically pop-up in or around a user interface for the plurality of hardware components.

14. The method of claim 1 further comprising:

combining the composite simulation method with a particle system simulation method creating a new composite method to simulate materials or combinations of fluids and materials.

15. The method of claim 1 further comprising:

splitting on the application on the network device a material or model to be simulated into a plurality of sub-components;

determining on the application on the network device a plurality of points of contact between the sub-components and a plurality of other sub-components for another material or another model being simulated; and adding on the application on the network device, data for the composite simulation method only to selected sub-components of the material or model being simulated where interactions or motion of the material or model being simulated is required.

16. The method of claim 1 further comprising:

creating on the application on the network device a simulation hierarchy with a N-number of levels, where a plurality of masses make up a body in a first level, a plurality of bodies are each treated as another plurality of masses in a larger body in a second level, a plurality of larger bodies are treated as masses in a yet-larger body in a third level in a pattern repeating for the N-number of levels; and adding on the application on the network device the simulation hierarchy to the composite simulation method to create a hierarchical composite method for simulating materials or methods.

17. The method of claim 16 wherein the hierarchical composite method includes a method to simulate a particle system including both particles and fluids or other viscous materials.

18. The method of claim 1, wherein the network device comprises one or more processors and one or more non-transitory computer readable mediums, the display is a 3D stereoscopic display oriented horizontally with a display area facing Up, the plurality of haptic devices are suspended above and behind the 3D stereoscopic display to have an operating range of the plurality of haptic devices that substantially covers a first portion of the 3D stereoscopic display's surface area, the head-trackers are positioned to make their range include an area in front of, to either side of, and above the 3D stereoscopic display so that a 3D space a user's head occupies during operation covers a second portion of the 3D stereoscopic display, and the audio speakers comprise three or more speakers that are placed around or above the 3D stereoscopic display so that a third operational area enclosed by the three or more speakers forms a convex hull above and around the 3D stereoscopic display and a user to make audio sounds panned between the three or more speakers so that an audio sound appears to be coming precisely from a specific location in 3D space with respect to the user.

19. A non-transitory computer readable medium on one or more processors on one or more network devices having stored therein a plurality of instructions for executing a method for simulating rigid, semi-rigid, and flexible components of materials and models comprising the steps of:

connecting to a network device with one or more processors from the one or more network devices, a display and a plurality of hardware components including a plurality of haptic devices, head trackers, stereoscopic displays and audio speakers connecting to each other and to the network device;

defining on an application on the network device one or more individual components for each of one or more entities being simulated, wherein a three-dimensional (3D) entity includes at least four individual components combined into the 3D entity being simulated and wherein each of the one or more individual components include a plurality of individual component portions;

defining on the application on the network device for each of the one or more individual components, a force transmission parameter obtained from a plurality of force transmission parameter values, a selected entity's rigid mass is greater than zero and less than its total mass, the plurality of force transmission parameter values including a first force transmission parameter value representing a fully flexible component, a second force transmission parameter value representing a fully rigid component and a plurality of other force transmission parameter values with values in-between the first force transmission parameter value and the second force transmission parameter value representing varying levels of semi-rigidity, wherein the selected entity's rigid mass is calculated according to the equation:

$$m_r = \sum_1^n m_i trans_i$$

wherein $m_r$ is a rigid mass, $m_i$, represents a mass of one of the selected entity's individual components and $trans_i$, is an individual component's corresponding force transmission parameter value;

combining on the application on the network device a method for simulating flexible entities with a method for simulating rigid entities into a composite simulation method, the composite method including each entity being simulated comprising one or more individual components and each individual component being individually defined with a separate force transmission parameter value, allowing each of the plurality of individual component portions of the one or more individual components of the entity being simulated to include any combination of rigid, semi-rigid and flexible components, simulating either similar materials or composites of different materials or models, wherein the method for simulating flexible entities that has been combined uses a model comprising individual point-masses connected by idealized springs or dashpots, wherein the one or more individual components are represented by the point-masses, wherein in the composite simulation method, an acceleration due to rigid motion is calculated according to the equation:

$$\ddot{x}_i^r = \frac{f_i}{m_r} trans_i,$$

wherein in the composite simulation method, an acceleration due to deformation is calculated according to the equation:

$$\ddot{x}_i^f = \frac{f_i}{m_i}(1 - trans_i),$$

wherein $f_i$ is a force applied to an individual component $\ddot{x}_i^r$ is an acceleration due to rigid motion
and $\ddot{x}_i^f$ is an acceleration due to deformation;

obtaining on the application on the network device with the composite simulation method a plurality of positions, velocities and accelerations and a defined force transmission parameter value for each of the one or more individual components of each of the one or more entities entity being simulated;

calculating on the application on the network device with the composite simulation method a plurality of forces and torques being applied on the one or more individual components of each of the one or more entities being simulated using the obtained positions, velocities or accelerations;

calculating on the application on the network device with the composite simulation method one or more of new positions, velocities and accelerations of the one or more individual components of each of the one or more entities entity being simulated using the calculated plurality of forces and torques and the one or more defined force transmission parameters;

receiving one or more selection inputs on the application on the network device with the composite simulation method from one or more haptic devices connected to the network device for virtually moving, pushing, cutting, tearing, creating holes therein, joining, melting or fusing one or more of the plurality of individual component portions of the one or more individual components of the one or more entities being simulated; and displaying in real-time on the application on the network device with the composite simulation method on a graphical user interface (GUI) with one or more graphical windows on the display the calculated one or more positions and any of the calculated one or more velocities or accelerations as a two-dimensional (2D) or a three dimensional (3D) graphical object view of a representation of each the one or more entities being simulated and presenting in real-time the composite simulation method's results as an output on the plurality of hardware components.

20. A system for simulating rigid, semi-rigid, and flexible components of materials and models comprising in combination:
- one or more network devices each with one or more processors and one or more non-transitory computer readable mediums;
- one or more applications on the one or more non-transitory computer readable mediums on the one or more network devices configured for:
    - for connecting to a network device with one or more processors from the one or more network devices and a display and a plurality of hardware components including a plurality of haptic devices, head trackers, stereoscopic displays and audio speakers to each other and to the network device;
    - for defining on an application the network device one or more individual components for each of one or more entities being simulated, wherein a three-dimensional (3D) entity includes at least four individual components combined into the 3D entity being simulated and wherein each of the one or more individual components include a plurality of individual component portions;
    - for defining on the application on the network device for each of the one or more individual components, a force transmission parameter obtained from a plurality of force transmission parameter values, a selected entity's rigid mass is greater than zero and less than its total mass, the plurality of force transmission parameter values including a first force transmission parameter value representing a fully flexible component, a second force transmission parameter value representing a fully rigid component and a plurality of other force transmission parameter values with values in-between the first force transmission parameter value and the second force transmission parameter value representing varying levels of semi-rigidity, wherein the selected entity's rigid mass is calculated according to the equation:

$$m_r = \sum_1^n m_i trans_i$$

wherein $m_r$ is a rigid mass, $m_i$ represents a mass of one of the selected entity's individual components and $trans_i$ is an individual component's corresponding force transmission parameter value;
- for combining on the application on the network device a method for simulating flexible entities with a method for simulating rigid entities into a composite simulation method, the composite method including each entity being simulated comprising one or more individual components and each individual component being individually defined with a separate force transmission parameter value, allowing each of the plurality of individual component portions of the one or more individual components of the entity being simulated to include any combination of rigid, semi-rigid and flexible components, simulating either similar materials or composites of different materials or models, wherein the method for simulating flexible entities that has been combined uses a model comprising individual point-masses connected by idealized springs or dashpots, wherein the one or more individual components are represented by the point-masses, wherein in the composite simulation method, an acceleration due to rigid motion is calculated according to the equation:

$$\ddot{x}_i^r = \frac{f_i}{m_r} trans_i,$$

wherein in the composite simulation method, an acceleration due to deformation is calculated according to the equation:

$$\ddot{x}_i^f = \frac{f_i}{m_i}(1 - trans_i),$$

wherein $f_i$ is a force applied to an individual component $\ddot{x}_i^r$ is an acceleration due to rigid motion
and $\ddot{x}_i^f$ is an acceleration due to deformation;
- for obtaining on the application on the network device with the composite simulation method a plurality of positions, velocities and accelerations and a defined force transmission parameter value for each of the one or more individual components of each of the one or more entities entity being simulated;
- for calculating on the application on the network device with the composite simulation method a plurality of forces and torques being applied on the one or more individual components of each of the one or more entities being simulated using the obtained positions, velocities or accelerations;
- for calculating on the application on the network device with the composite simulation method one or more of new positions, velocities and accelerations of the one or more individual components of each of the one or more entities entity being simulated using the calculated plurality of forces and torques and the one or more defined force transmission parameters;
- for receiving one or more selection inputs on the application on the network device with the composite simulation method from one or more haptic devices connected to the network device for virtually moving, pushing, cutting, tearing, creating holes therein, joining, melting or fusing one or more of the plurality of individual component portions of the one or more individual components of the one or more entities being simulated; and
- for displaying in real-time on the application on the network device with the composite simulation method on a graphical user interface (GUI) with one or more graphical windows on the display the calculated one or more positions and any of the calculated one or more velocities or accelerations as a two-dimensional (2D) or a three dimensional (3D) graphical object view of a representation of each the one or more entities being simulated and presenting in real-time the composite simulation method's results as an output on the plurality of hardware components.

* * * * *